US012563346B2

(12) United States Patent
Lee

(10) Patent No.: US 12,563,346 B2
(45) Date of Patent: Feb. 24, 2026

(54) FLEXIBLE ELECTRONIC DEVICE AND METHOD FOR ADJUSTING SOUND OUTPUT THEREOF

(71) Applicant: SAMSUNG ELECTRONICS CO., LTD., Suwon-si (KR)

(72) Inventor: Byungmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 18/196,306

(22) Filed: May 11, 2023

(65) Prior Publication Data

US 2023/0283961 A1     Sep. 7, 2023

Related U.S. Application Data

(63) Continuation of application No. PCT/KR2021/016496, filed on Nov. 12, 2021.

(30) Foreign Application Priority Data

Nov. 13, 2020     (KR) ........................ 10-2020-0151663

(51) Int. Cl.
*H04R 17/00*          (2006.01)
*G06F 1/16*          (2006.01)
*G06F 3/16*          (2006.01)

(52) U.S. Cl.
CPC ......... *H04R 17/005* (2013.01); *G06F 1/1652* (2013.01); *G06F 3/165* (2013.01); *H04R 2499/11* (2013.01)

(58) Field of Classification Search
CPC .. H04R 17/005; H04R 2499/11; H04R 7/045; H04R 3/12; G06F 1/1652; G06F 3/165;
(Continued)

(56) References Cited

U.S. PATENT DOCUMENTS 8,379,888 B2 *   2/2013   Lee ........................ H04R 17/00
                                                              381/116
8,816,977 B2 *   8/2014   Rothkopf ................ G06F 3/016
                                                              345/169
(Continued)

FOREIGN PATENT DOCUMENTS

CN          111418001 A      7/2020
KR          10-1534428 B1    7/2015
(Continued)

OTHER PUBLICATIONS

International Search Report (PCT/ISA/210) issued by the International Searching Authority on Feb. 14, 2022 in International Application No. PCT/KR2021/016496.
(Continued)

*Primary Examiner* — Akelaw Teshale

(74) *Attorney, Agent, or Firm* — Sughrue Mion, PLLC

(57)          ABSTRACT

A flexible electronic device includes: a sensor; a flexible display; a piezoelectric speaker including N piezoelectric films attached to the flexible display; and a processor configured to: detect a change of a state of the flexible display through the sensor; based on the change of the state of the flexible display, determine locations of a number of piezoelectric films through which sound is to be output, among the N piezoelectric films; and output sound through the number of piezoelectric films by controlling the piezoelectric films to be activated, based on the determined locations of the number of piezoelectric films.

16 Claims, 14 Drawing Sheets

(58) Field of Classification Search

CPC .... G06F 1/1624; G06F 1/1633; G06F 1/1677;
G06F 1/1688; G06F 1/1694; G06F
1/3215; G06F 1/3278; G06F 1/3287;
G06F 2200/1637; G06F 2203/04102;
G09F 9/30; G09F 9/301

See application file for complete search history.

(56)                    References Cited

U.S. PATENT DOCUMENTS

| | | | |
|---|---|---|---|
| 9,282,407 B2 * | 3/2016 | Kim | G06F 1/1679 |
| 9,448,593 B2 | 9/2016 | Kim et al. | |
| 9,820,055 B2 | 11/2017 | Babayoff et al. | |
| 10,088,927 B2 | 10/2018 | Rothkopf et al. | |
| 10,219,077 B2 | 2/2019 | Choi et al. | |
| 10,754,386 B2 | 8/2020 | Lee et al. | |
| 10,959,025 B2 * | 3/2021 | Lee | H10N 30/87 |
| 11,343,600 B2 * | 5/2022 | Park | H04R 3/12 |
| 12,284,481 B2 * | 4/2025 | Strohmann | G06F 3/0436 |
| 12,375,859 B2 * | 7/2025 | Kikuchi | H04R 1/46 |
| 2009/0051830 A1 | 2/2009 | Matsushita et al. | |
| 2010/0086151 A1 * | 4/2010 | Ruiter | H04R 17/00 |
| | | | 381/190 |
| 2012/0057730 A1 * | 3/2012 | Fujise | H04R 17/00 |
| | | | 381/190 |
| 2012/0140969 A1 * | 6/2012 | Fujise | H04R 17/00 |
| | | | 381/190 |
| 2012/0155678 A1 * | 6/2012 | Liu | H04R 17/00 |
| | | | 381/190 |
| 2012/0242592 A1 * | 9/2012 | Rothkopf | G06F 3/041 |
| | | | 345/173 |
| 2014/0119576 A1 * | 5/2014 | Ando | H04R 17/005 |
| | | | 381/162 |
| 2014/0241551 A1 * | 8/2014 | Kim | G06F 1/1677 |
| | | | 381/306 |
| 2016/0005951 A1 * | 1/2016 | Yoshida | H10N 30/208 |
| | | | 310/354 |
| 2016/0150342 A1 | 5/2016 | Choi et al. | |
| 2019/0122018 A1 * | 4/2019 | Kho | G06V 40/1306 |
| 2019/0141424 A1 * | 5/2019 | Kim | H04R 7/045 |
| 2019/0205603 A1 * | 7/2019 | Lee | G06V 40/1318 |
| 2019/0324501 A1 | 10/2019 | Kim et al. | |
| 2020/0033205 A1 * | 1/2020 | Mori | H10N 30/857 |
| 2020/0077194 A1 | 3/2020 | Kim | |
| 2020/0314513 A1 * | 10/2020 | Park | H04R 1/025 |
| 2020/0349880 A1 | 11/2020 | Watson et al. | |
| 2020/0402434 A1 | 12/2020 | Yamazuki et al. | |
| 2021/0044903 A1 * | 2/2021 | Abe | H04R 7/26 |
| 2021/0377670 A1 * | 12/2021 | Strohmann | H04R 1/028 |
| 2022/0102619 A1 * | 3/2022 | Kikuchi | C08F 20/34 |
| 2022/0124439 A1 * | 4/2022 | Han | H04R 17/00 |
| 2022/0201400 A1 * | 6/2022 | Kho | H04R 17/00 |
| 2023/0360627 A1 * | 11/2023 | Oto | H04R 1/403 |

FOREIGN PATENT DOCUMENTS

| | | |
|---|---|---|
| KR | 10-2016-0081786 A | 7/2016 |
| KR | 10-2019-0117985 A | 10/2019 |
| KR | 10-2019-0122389 A | 10/2019 |
| KR | 10-2020-0021392 A | 2/2020 |
| KR | 10-2020-0025152 A | 3/2020 |
| KR | 10-2020-0114914 A | 10/2020 |

OTHER PUBLICATIONS

Written Opinion (PCT/ISA/237) issued by the International Searching Authority on Feb. 14, 2022 in International Application No. PCT/KR2021/016496.

Notice of Allowance dated Sep. 30, 2025, issued by Korean Intellectual Property Office in Korean Patent Application No. 10-2020-0151663.

* cited by examiner

FIG. 5

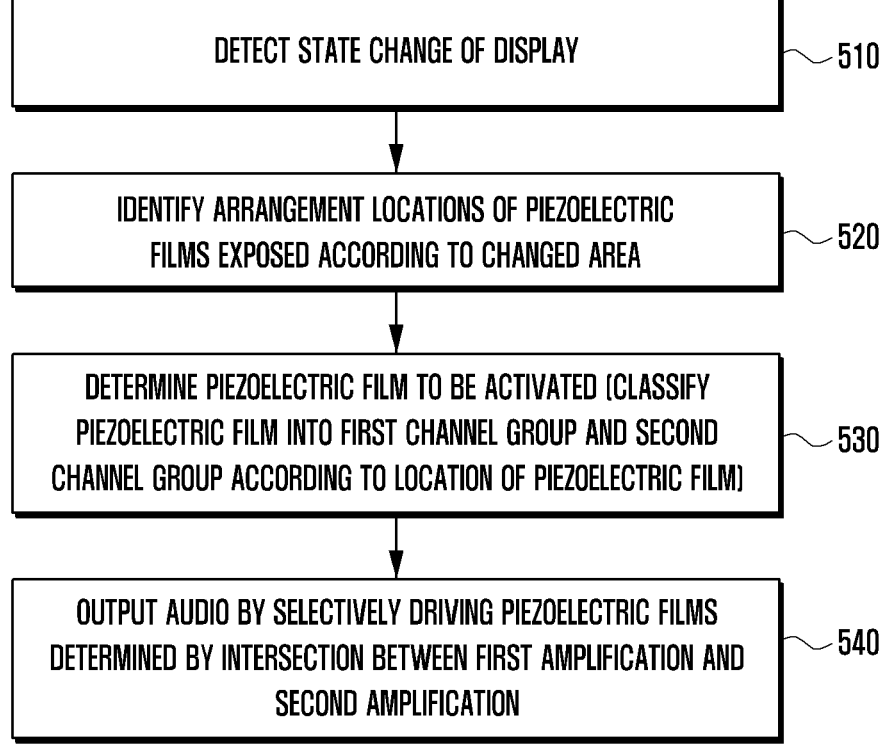

DETECT STATE CHANGE OF DISPLAY — 510

IDENTIFY ARRANGEMENT LOCATIONS OF PIEZOELECTRIC FILMS EXPOSED ACCORDING TO CHANGED AREA — 520

DETERMINE PIEZOELECTRIC FILM TO BE ACTIVATED (CLASSIFY PIEZOELECTRIC FILM INTO FIRST CHANNEL GROUP AND SECOND CHANNEL GROUP ACCORDING TO LOCATION OF PIEZOELECTRIC FILM) — 530

OUTPUT AUDIO BY SELECTIVELY DRIVING PIEZOELECTRIC FILMS DETERMINED BY INTERSECTION BETWEEN FIRST AMPLIFICATION AND SECOND AMPLIFICATION — 540

FLEXIBLE ELECTRONIC DEVICE AND METHOD FOR ADJUSTING SOUND OUTPUT THEREOF

CROSS-REFERENCE TO RELATED APPLICATIONS

This application is a by-pass continuation application of International Application No. PCT/KR2021/016496, filed on Nov. 12, 2021, which is based on and claims priority to Korean Patent Application No. 10-2020-0151663, filed on Nov. 13, 2020, in the Korean Intellectual Property Office, the disclosures of which are incorporated by reference herein their entireties.

BACKGROUND

1. Field

One or more embodiments relate to a flexible electronic device and a method for adjusting sound output thereof.

2. Description of Related Art

Recently, in order to meet the needs of users who want newer and more diverse functions, the structure of the electronic device is evolving to have an expanded display or a display having an improved availability. For example, flexible (e.g., rollable) electronic devices capable of varying a display size through a deformable flexible display are being released. The flexible electronic devices may enable structural deformation of a display, but in the case of portable flexible electronic devices, there may be space restrictions in arranging electronic device components due to the limited size thereof.

The piezoelectric effect may be an effect in which a potential difference is generated when pressure or vibration is applied to a piezoelectric body, and deformation or vibration is generated in a piezoelectric body when a potential difference is applied. A piezoelectric speaker (or a piezo speaker) using the piezoelectric effect may be a speaker using the principle of generating sound by causing deformation or vibration by applying a potential difference to a piezoelectric body. The piezoelectric speaker may have a simple structure, may be driven with low voltage, and may be variously applied in a flat type. As a result, various electronic products that provide sound through piezoelectric speakers instead of existing speakers are being released.

SUMMARY

Various embodiments provide a device and method in which a piezoelectric speaker is implemented in a flexible (e.g., rollable) electronic device to secure a space for placing the speaker, and a sound output is automatically varied according to the environment or scenario used by users, thereby outputting sound.

According to an aspect of the disclosure, a flexible electronic device includes: a sensor; a flexible display; a piezoelectric speaker including N piezoelectric films attached to the flexible display; and a processor configured to: detect a change of a state of the flexible display through the sensor; based on the change of the state of the flexible display, determine locations of a number of piezoelectric films through which sound is to be output, among the N piezoelectric films; and output sound through the number of piezoelectric films by controlling the piezoelectric films to be activated, based on the determined locations of the number of piezoelectric films.

The piezoelectric speaker may further include a vibration film, a first amplification circuit, and a second amplification circuit, and a driving signal is applied to the number of piezoelectric films by a crossing signal of the first amplification circuit and the second amplification circuit.

The flexible electronic device may further include a housing, and the processor may be further configured to: detect, through the sensor, a first state in which at least a part of the flexible display is drawn into an inner space of the housing or a second state in which at least a part of the flexible display is drawn out to an outer space of the housing; and select the number of piezoelectric films based on the first state or the second state.

The processor may be further configured to detect the first state or the second state, based on an electrical signal generated from the N piezoelectric films.

The processor may be further configured to: classify the number of piezoelectric films into a first group and a second group; output sound of a first signal via the first group; and output sound of a second signal via the second group.

The processor may be further configured to: detect a posture change of the flexible electronic device through the sensor; and determine locations and the number of piezoelectric films based on the posture change.

The processor may be further configured to: detect an input for adjusting volume; and based on the input for adjusting volume, increase and select the number of piezoelectric films through which sound is output among the N piezoelectric films.

The processor may be further configured to: display visual information corresponding to an audio signal through the flexible display; identify a set of piezoelectric films disposed in a region in which the visual information is displayed; and drive the identified set of piezoelectric films to output sound.

The processor may be further configured to: based on detection of movement of the visual information displayed on the flexible display, identify another set of piezoelectric films based on the movement of the visual information, and drive the identified another set of piezoelectric films to output sound.

According to an aspect of the disclosure, a method for adjusting sound output by an electronic device including a flexible display, includes: detecting a change of a state of the flexible display to which a piezoelectric speaker is attached, the piezoelectric speaker including N piezoelectric films; based on the change of a state of the flexible display, determining locations and a number of piezoelectric films through which sound is to be output, among the N piezoelectric films; and outputting sound by controlling the piezoelectric films to be activated, based on the determined locations of the number of piezoelectric films.

The detecting the change of a state of the flexible display may include detecting a first state in which at least a part of the flexible display is drawn into an inner space of a housing or a second state in which at least a part of the flexible display is drawn out to an outer space of the housing, and the determining the locations and the number of piezoelectric films may include selecting the number of piezoelectric films based on the first state or the second state.

The outputting sound through the number of piezoelectric films may include: classifying the number of piezoelectric films into a first group and a second group; outputting sound of a first signal via the first group; and outputting sound of a second signal via the second group.

The method may further include detecting a posture change of the electronic device, and the number of piezoelectric films are changed based on the posture change.

The determining the locations and the number of piezoelectric films may include: detecting an input for adjusting volume; and based on the input for adjusting volume, increasing and selecting the number of piezoelectric films among the N piezoelectric films.

The outputting sound through the number of piezoelectric films may include: displaying visual information corresponding to an audio signal through the flexible display; identifying a set of piezoelectric films disposed in a region in which the visual information is displayed; and driving the identified set of piezoelectric films to output sound to the region in which the visual information is displayed.

The driving the identified set of piezoelectric films to output sound to the region in which the visual information is displayed may include, based on detection of movement of the visual information displayed on the flexible display, driving another set of piezoelectric films, based on the movement of the visual information to output sound through the another set of piezoelectric films According to an aspect of the disclosure, a flexible electronic device includes: a sensor; a flexible display; a piezoelectric speaker including N piezoelectric films attached to the flexible display; and a processor configured to: detect a change of a state of the flexible display through the sensor; based on the change of the state of the flexible display, determine locations of a number of piezoelectric films through which sound is to be output, among the N piezoelectric films; and output sound through the number of piezoelectric films by controlling the piezoelectric films to be activated, based on the determined locations of the number of piezoelectric films.

The piezoelectric speaker may further include a vibration film, a first amplification circuit, and a second amplification circuit, and a driving signal is applied to the number of piezoelectric films by a crossing signal of the first amplification circuit and the second amplification circuit.

The flexible electronic device may further include a housing, and the processor may be further configured to: detect, through the sensor, a first state in which at least a part of the flexible display is drawn into an inner space of the housing or a second state in which at least a part of the flexible display is drawn out to an outer space of the housing; and select the number of piezoelectric films based on the first state or the second state.

The processor may be further configured to detect the first state or the second state, based on an electrical signal generated from the N piezoelectric films.

The processor may be further configured to: classify the number of piezoelectric films into a first group and a second group; output sound of a first signal via the first group; and output sound of a second signal via the second group.

The processor may be further configured to: detect a posture change of the flexible electronic device through the sensor; and determine locations and the number of piezoelectric films based on the posture change.

The processor may be further configured to: detect an input for adjusting volume; and based on the input for adjusting volume, increase and select the number of piezoelectric films through which sound is output among the N piezoelectric films.

The processor may be further configured to: display visual information corresponding to an audio signal through the flexible display; identify a set of piezoelectric films disposed in a region in which the visual information is displayed; and drive the identified set of piezoelectric films to output sound.

The processor may be further configured to: based on detection of movement of the visual information displayed on the flexible display, identify another set of piezoelectric films based on the movement of the visual information, and drive the identified another set of piezoelectric films to output sound.

According to an aspect of the disclosure, a method for adjusting sound output by an electronic device including a flexible display, includes: detecting a change of a state of the flexible display to which a piezoelectric speaker is attached, the piezoelectric speaker including N piezoelectric films; based on the change of a state of the flexible display, determining locations and a number of piezoelectric films through which sound is to be output, among the N piezoelectric films; and outputting sound by controlling the piezoelectric films to be activated, based on the determined locations of the number of piezoelectric films.

The detecting the change of a state of the flexible display may include detecting a first state in which at least a part of the flexible display is drawn into an inner space of a housing or a second state in which at least a part of the flexible display is drawn out to an outer space of the housing, and the determining the locations and the number of piezoelectric films may include selecting the number of piezoelectric films based on the first state or the second state.

The outputting sound through the number of piezoelectric films may include: classifying the number of piezoelectric films into a first group and a second group; outputting sound of a first signal via the first group; and outputting sound of a second signal via the second group.

The method may further include detecting a posture change of the electronic device, and the number of piezoelectric films are changed based on the posture change.

The determining the locations and the number of piezoelectric films may include: detecting an input for adjusting volume; and based on the input for adjusting volume, increasing and selecting the number of piezoelectric films among the N piezoelectric films.

The outputting sound through the number of piezoelectric films may include: displaying visual information corresponding to an audio signal through the flexible display; identifying a set of piezoelectric films disposed in a region in which the visual information is displayed; and driving the identified set of piezoelectric films to output sound to the region in which the visual information is displayed.

The driving the identified set of piezoelectric films to output sound to the region in which the visual information is displayed may include, based on detection of movement of the visual information displayed on the flexible display, driving another set of piezoelectric films, based on the movement of the visual information to output sound through the another set of piezoelectric films.

According to one or more embodiments, sound may be output by automatically adjusting a region or location from sound is to be output, according to structural deformation of a display of an electronic device or a change of a state of the electronic device.

According to one or more embodiments, an output of sound may be adjusted by variably changing the location of a piezoelectric film in a piezoelectric speaker according to structural deformation of a display of an electronic device and a change of a state of the electronic device.

BRIEF DESCRIPTION OF THE DRAWINGS

The above and other aspects, features, and advantages of certain embodiments of the disclosure will be more apparent

5

Figure 1:
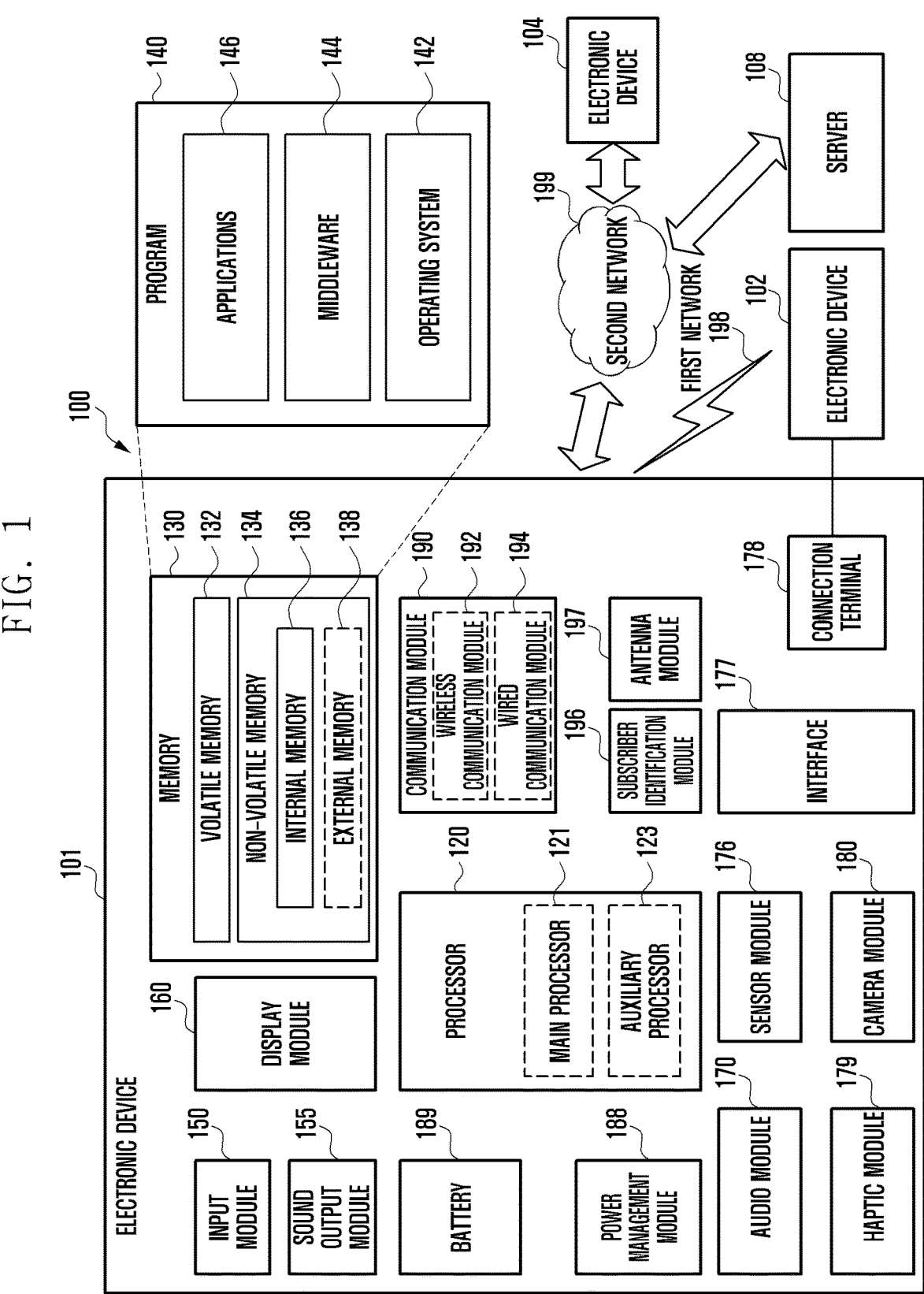
Figure 2:
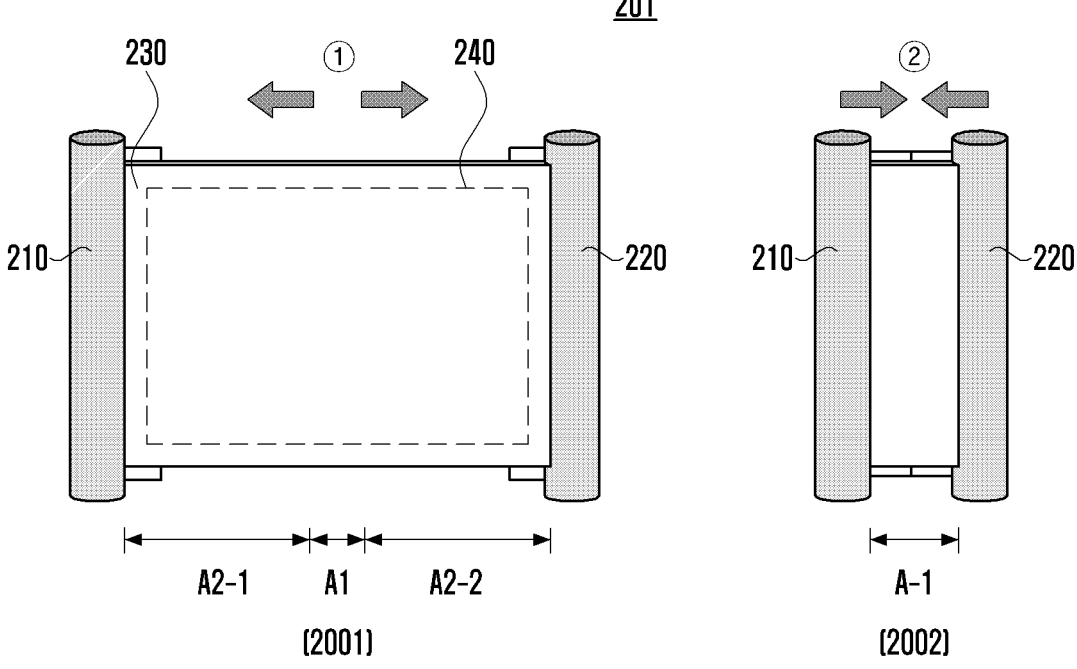
Figure 3:
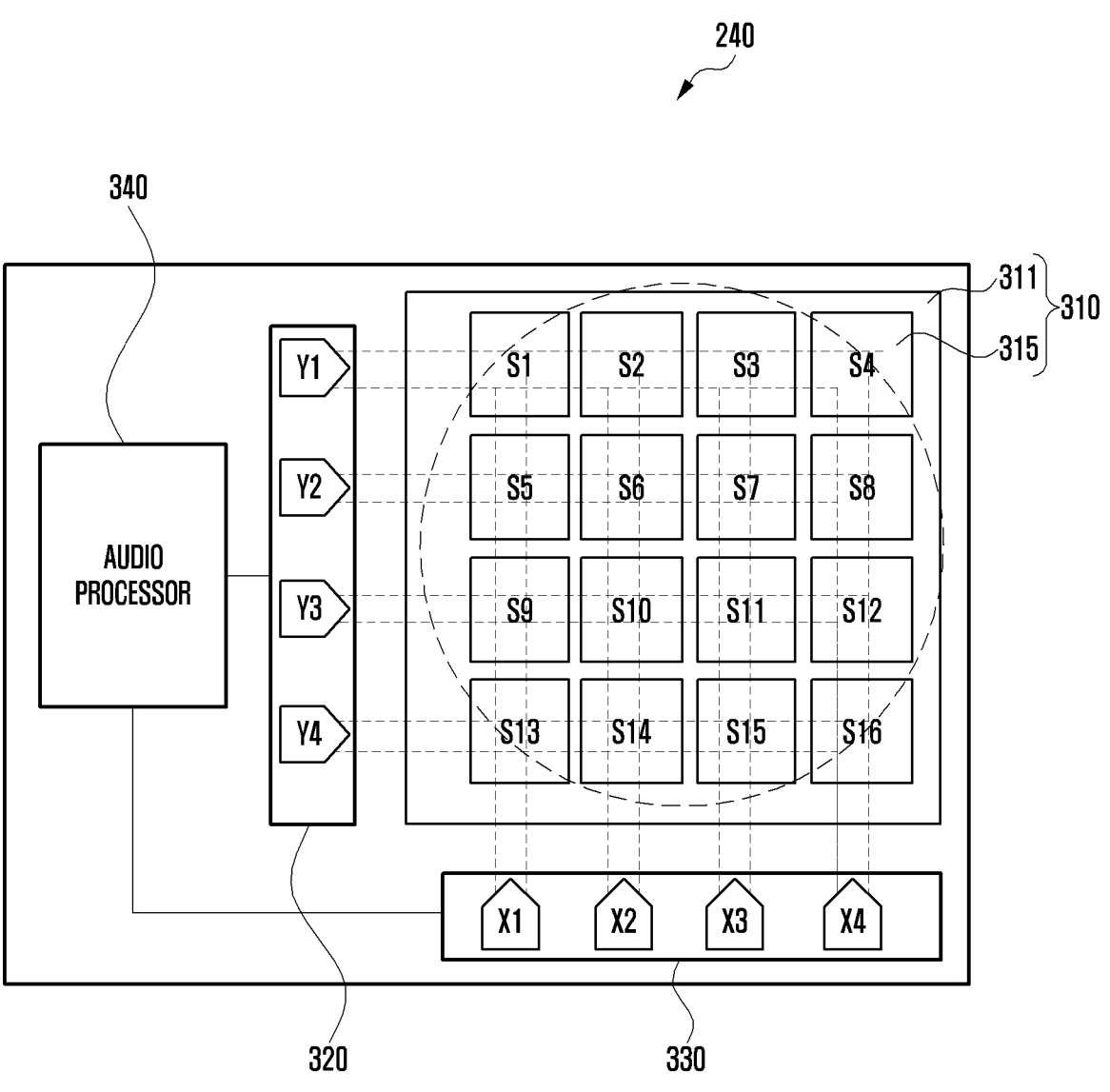
Figure 4:
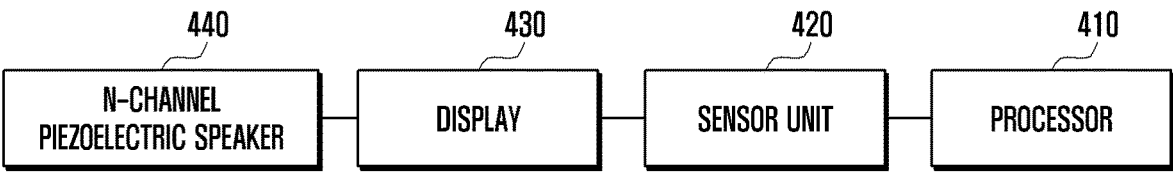
Figure 6:
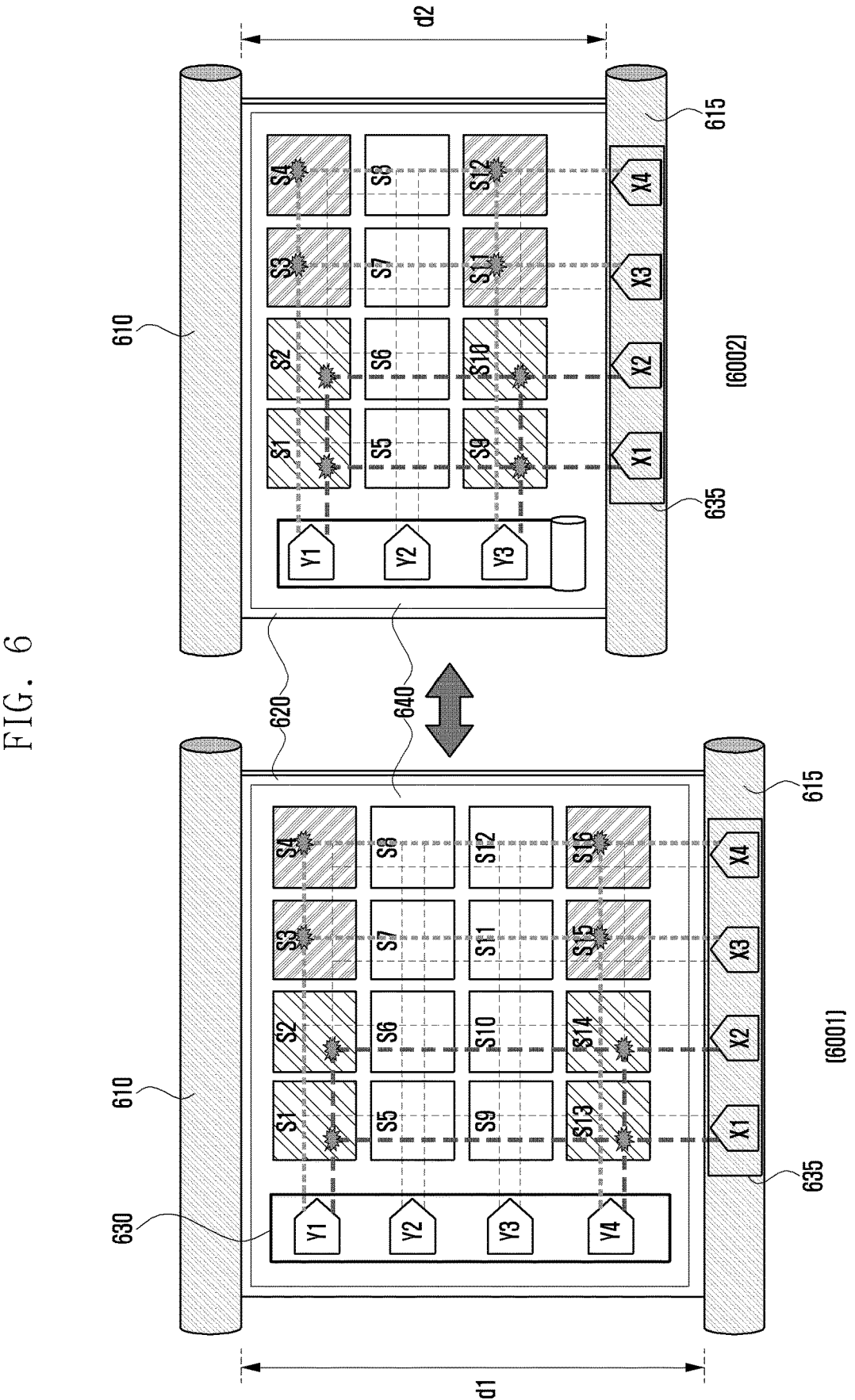
Figure 7:
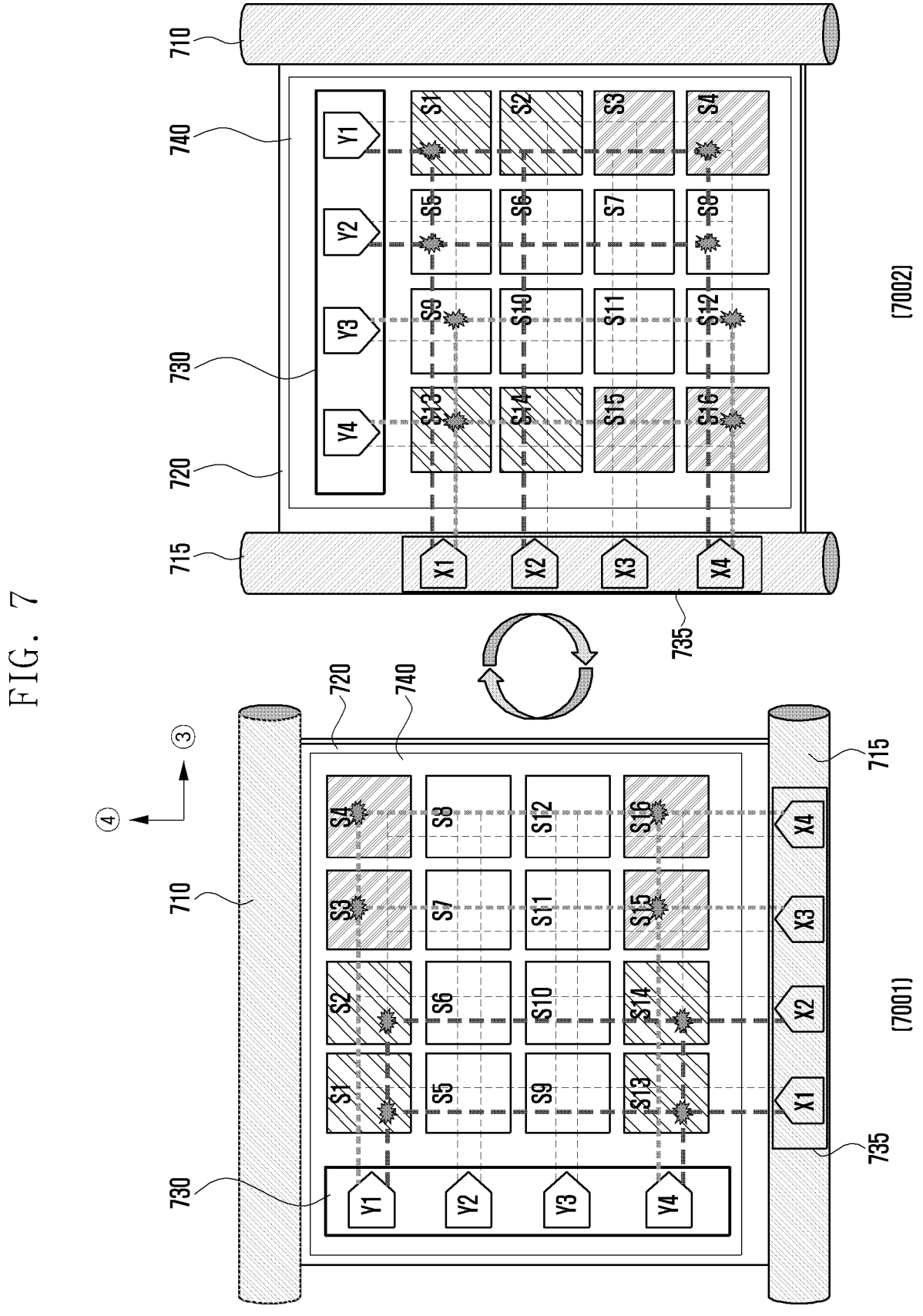
Figure 8:
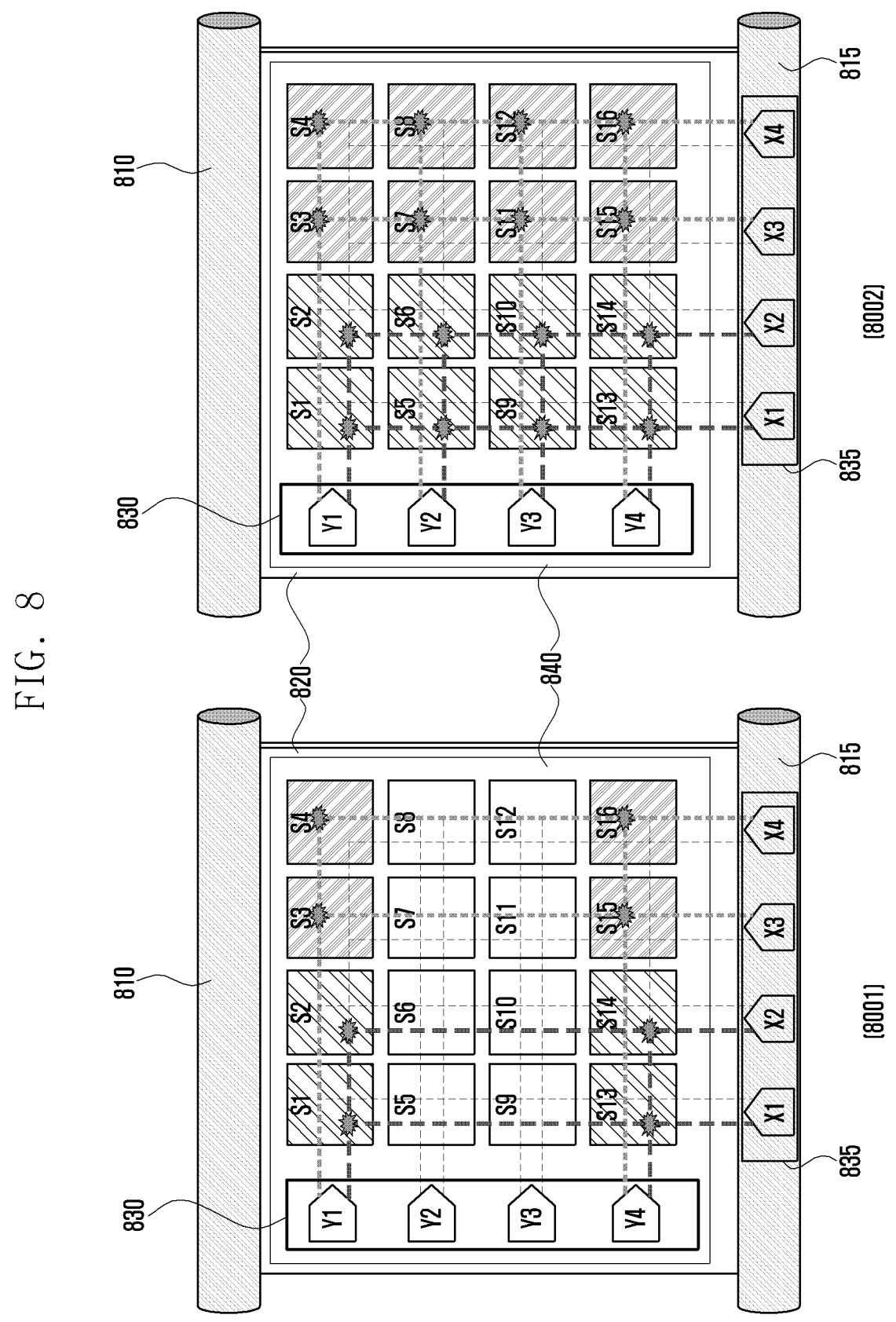
Figure 9:
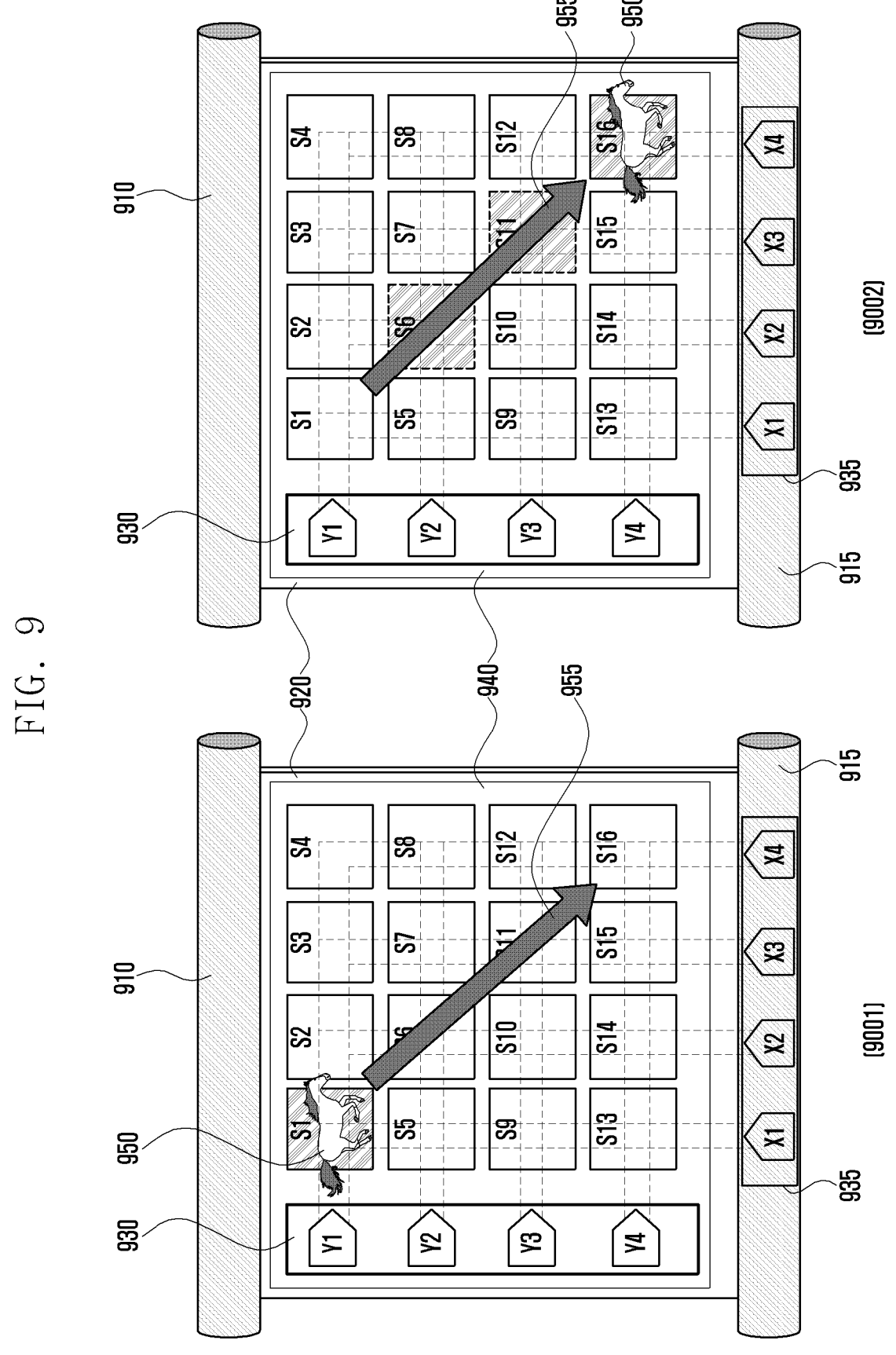
Figure 10A:
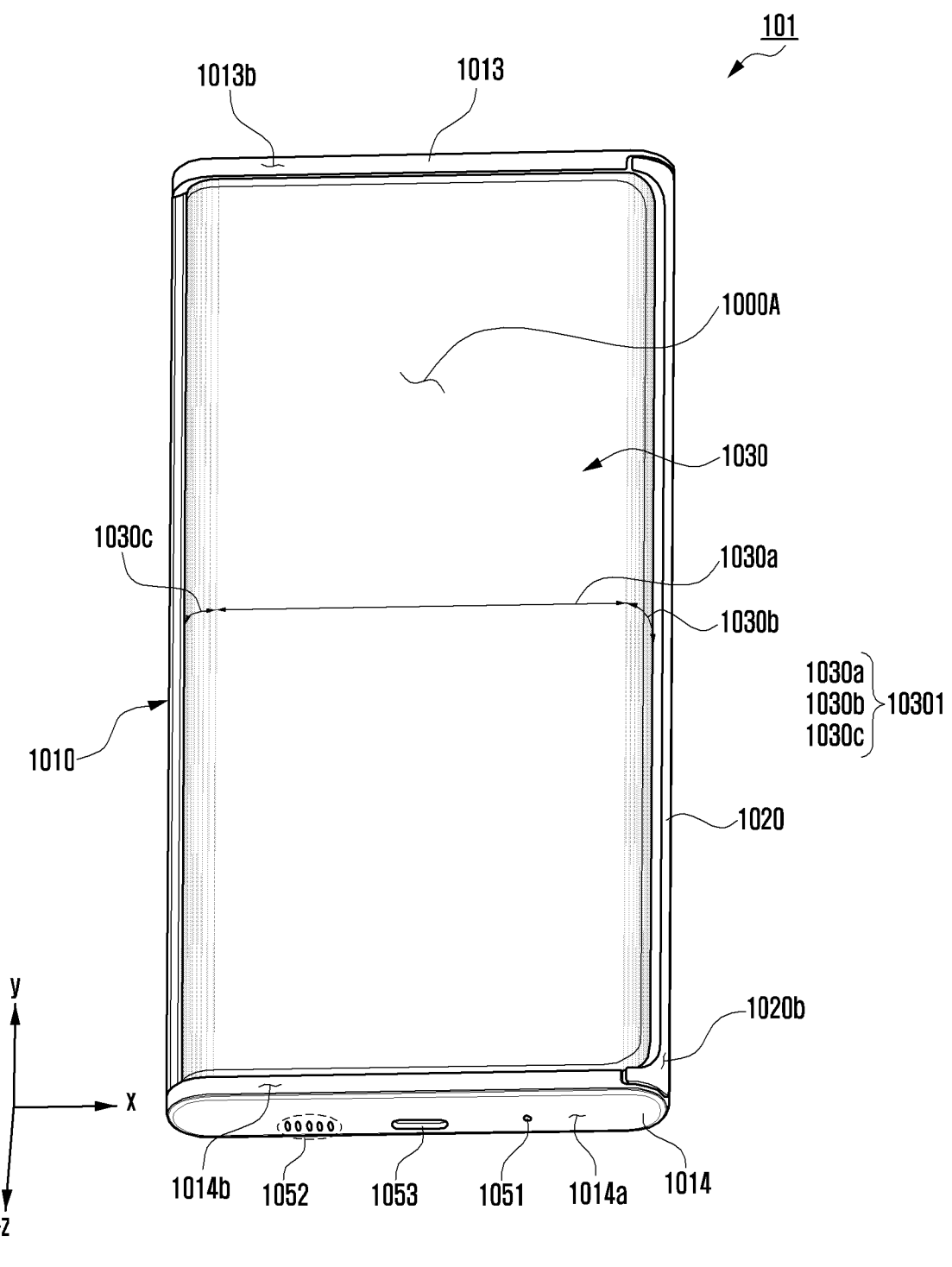
Figure 10B:
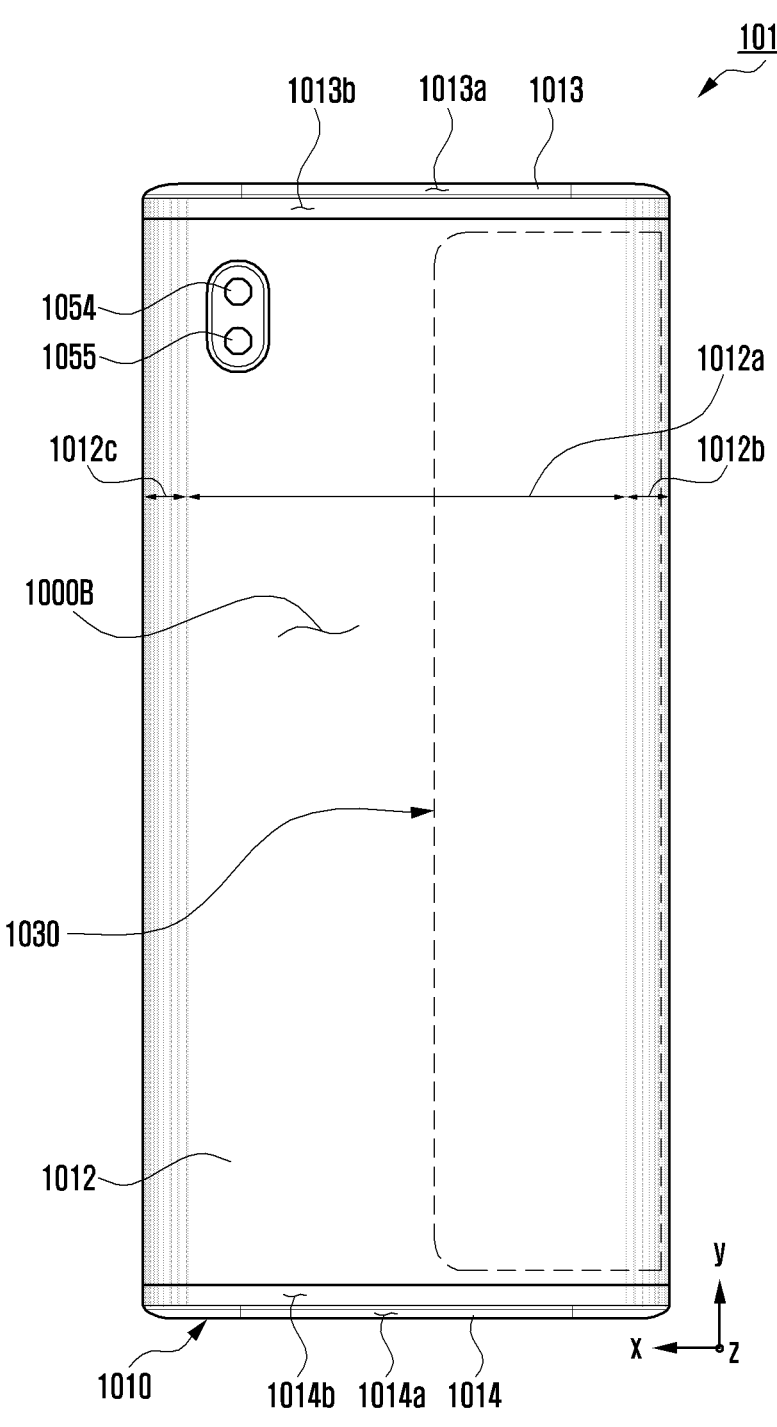
Figure 11A:
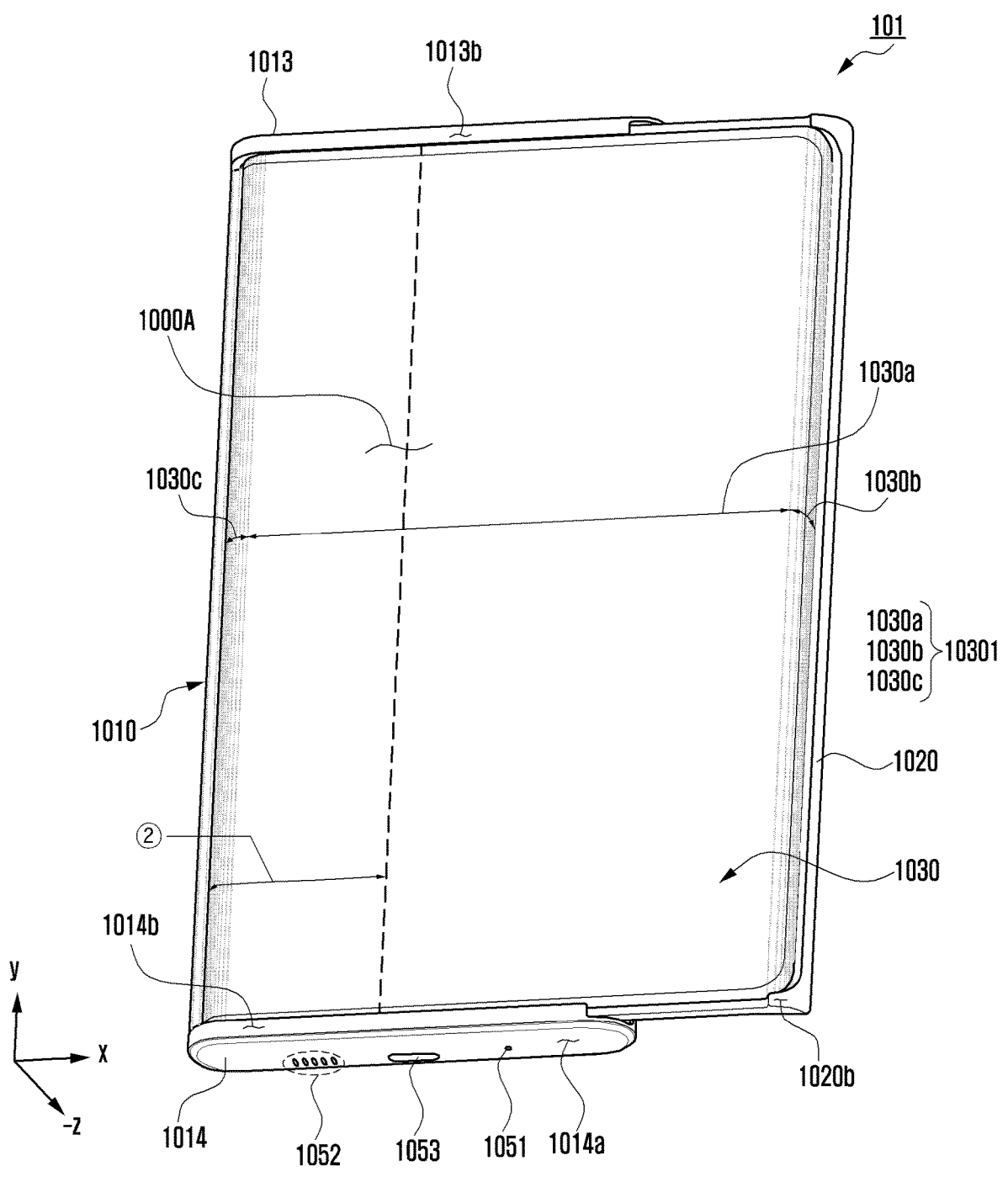
Figure 11B:
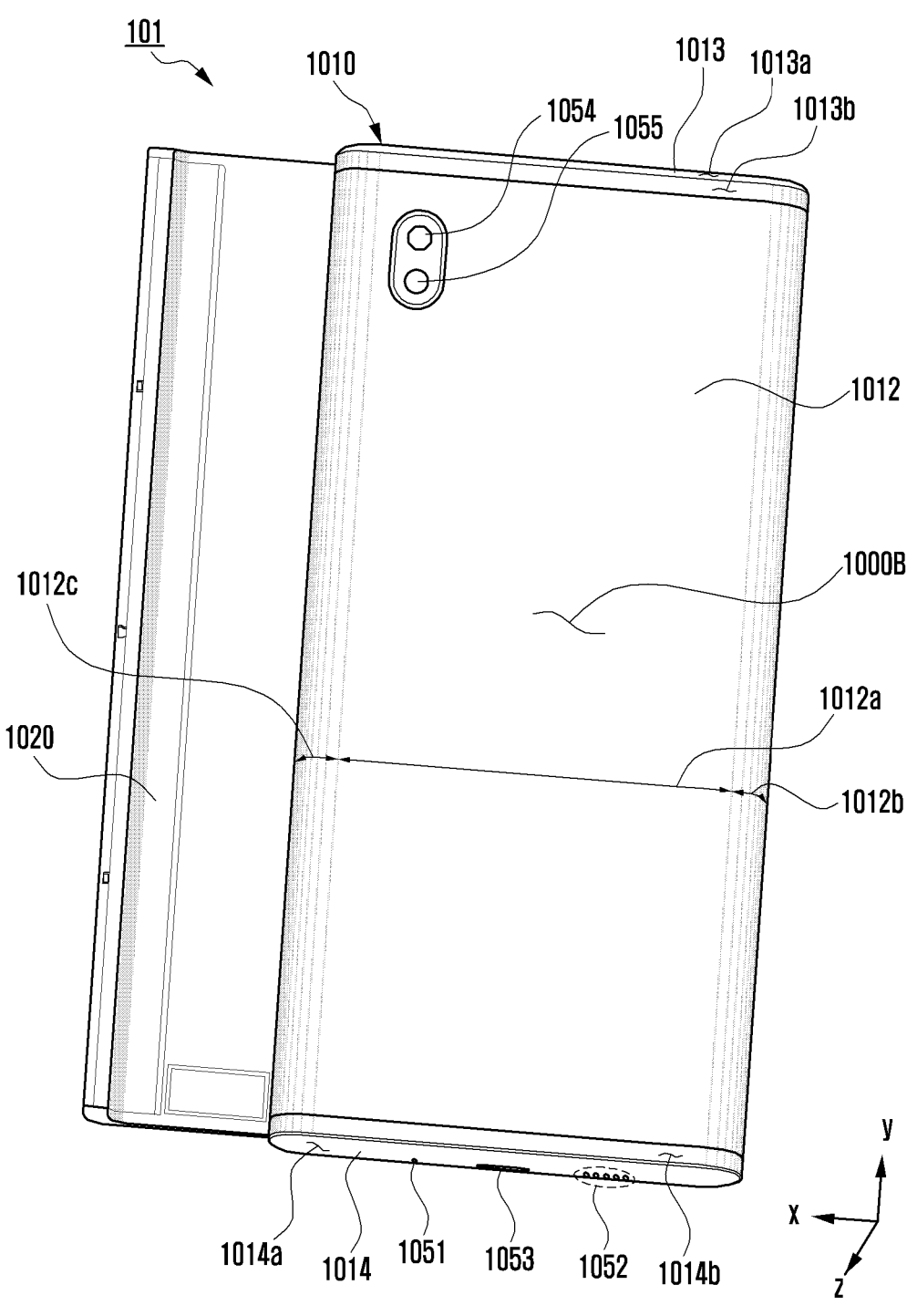
Figure 12:
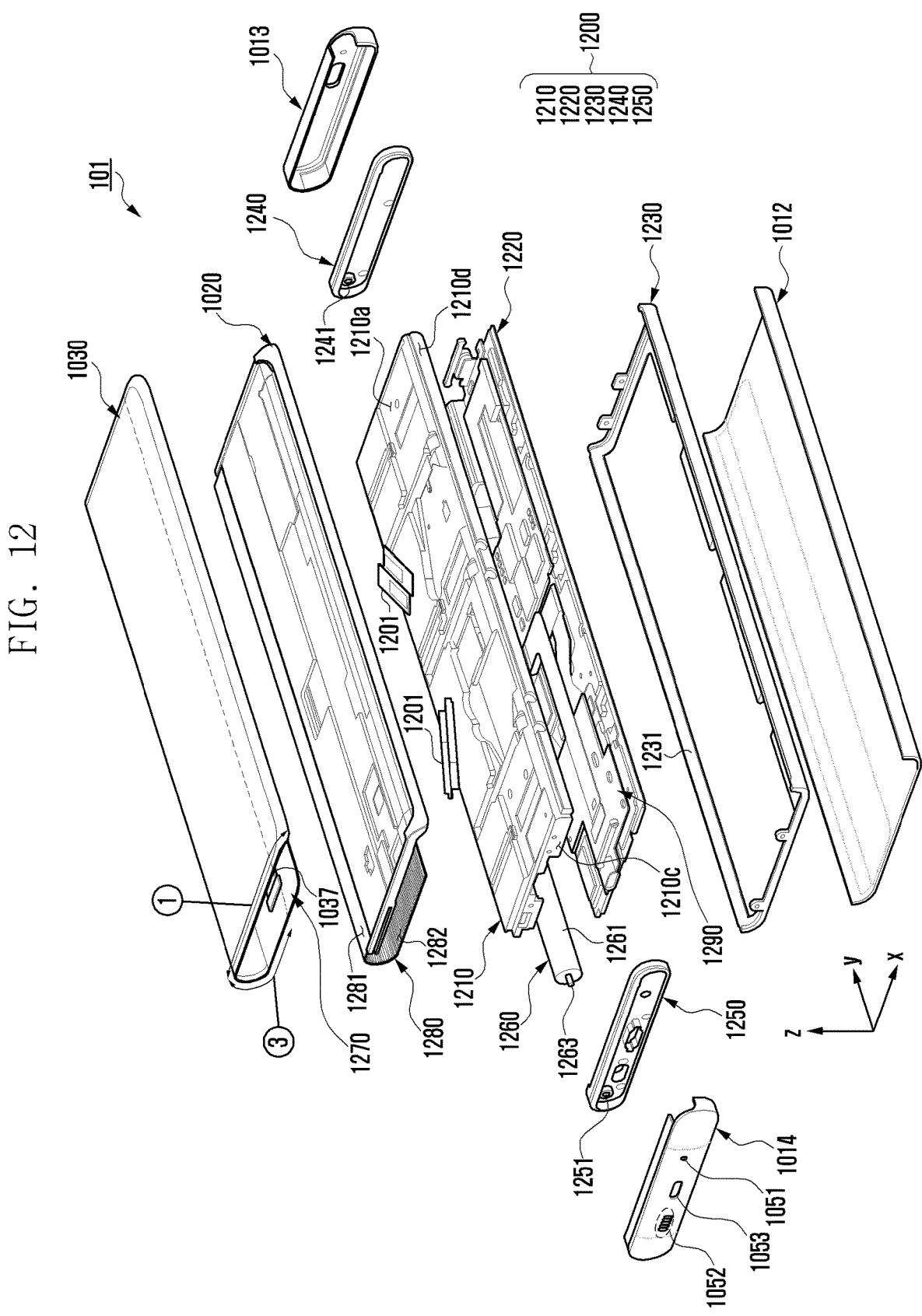

6 from the following description taken in conjunction with the accompanying drawings, in which:

FIG. 1 illustrates an electronic device in a network environment according to an embodiment of the disclosure;

FIG. 2 illustrates a change of a state of an electronic device according to one or more embodiments;

FIG. 3 illustrates the structure of a piezoelectric speaker module according to one or more embodiments;

FIG. 4 illustrates a configuration of an electronic device according to one or more embodiments;

FIG. 5 illustrates a method for adjusting sound output by a flexible electronic device according to one or more embodiments;

FIG. 6 illustrates a situation in which sound output is adjusted by a flexible electronic device according to one or more embodiments;

FIG. 7 illustrates a situation in which sound output is adjusted by a flexible electronic device according to one or more embodiments;

FIG. 8 illustrates a situation in which sound output is adjusted by a flexible electronic device according to one or more embodiments;

FIG. 9 illustrates a situation in which sound output is adjusted by a flexible electronic device according to one or more embodiments;

FIG. 10A illustrates a front perspective view of the electronic device in a closed state according to an embodiment;

FIG. 10B illustrates a rear perspective view of the electronic device in a closed state according to an embodiment;

FIG. 11A illustrates a front perspective view of the electronic device in an open state according to an embodiment;

FIG. 11B illustrates a rear perspective view of the electronic device 101 in an open state according to an embodiment; and FIG. 12 illustrates an exploded perspective view of the electronic device 101 of FIG. 10A according to an embodiment.

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery

189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Hereinafter, the electronic device 101 according to various embodiments will be described as a flexible (e.g., rollable) electronic device implemented to have a display panel, a display region of which is reducible or expandable according to structural deformation of the display panel, but is not limited thereto. A flexible (e.g., rollable) electronic device may also be implemented as various types of devices having display functions, such as monitors and TVs.

FIG. 2 illustrates a change of a state of an electronic device according to one or more embodiments.

Referring to FIG. 2, an electronic device 201 (e.g., the electronic device 101 in FIG. 1) according to one or more embodiments may be implemented as a flexible (e.g., rollable) electronic device capable of expanding the area of a display 230 in a sliding manner.

According to an embodiment, the electronic device 201 may include a first housing 210, a second housing 220, a display 230 disposed to be received in at least a part of the first housing 210 and the second housing 220, and a piezoelectric speaker 240. In one embodiment, the electronic device 201 may further include at least some of the components and/or functions of the electronic device 101 in FIG. 1, in addition to the illustrated components. For example, at least some of the components shown in FIG. 1 may be disposed in the first housing 210 and the second housing 220.

In an embodiment, screen 2001 shows the electronic device 201 in a state in which the area of the display 230 is expanded, and screen 2002 shows the electronic device 201 in a state in which the area of the display 230 is not expanded. For example, the state in which the area of the display 230 is expanded may be an open state in which the display 230 is no longer expanded by slide-out, and a state in which the area of the display 230 is not expanded may be in a closed state in which the display 230 is not slid out. The slide-out may refer to a partial movement of at least one of the first housing 210 and the second housing 220 in a first direction (e.g., direction ①) when the electronic device 201 is transitioned from a closed state to an open state. The slide-in may refer to movement of the first housing 210 and the second housing 220 in a second direction (e.g., direction ②)) when the electronic device 201 is transitioned from an open state to a closed state. Compared to the closed state, the open state may be defined as a state in which an area of the display 230 is expanded.

According to an embodiment, the electronic device 201 may provide the display 230 having an area which is variable according to the moved positions of the first housing 210 and the second housing 220. For example, a user may adjust the area (e.g., a display region, an activated region) of the display 230 of the electronic device 201 according to the use environment by using a flexible (e.g., rollable) characteristic.

According to an embodiment, the state of the electronic device 201 may include an intermediated state. The intermediate state may mean a state between the open state of <2001> and the closed state of <2002>.

According to an embodiment, the display 230 is a flexible display and may include a display region (or an activated region) for outputting visual information. The display region of the display 230 may vary according to the movement of the first housing 210 or/and the second housing 220 or the deformation of the display 230.

According to an embodiment, the electronic device 201 may include a sliding structure related to the display 230. For example, the electronic device 201 may be implemented to enable at least one of the first housing 210 and the second housing 220 to slide.

When the display 230 is moved a configured distance by an external force, the electronic device 201 may be transitioned from a closed state to an open state or from an open state to a closed state without any further external force due to an elastic structure included in the sliding structure (e.g., a semi-automatic sliding motion).

According to an embodiment, when a signal is generated through the input device, the electronic device 201 may be transitioned from a closed state to an open state or from an open state to a closed state through a driving device connected to the display 230. For example, when a signal is generated through a hardware button or a software button provided through a screen, the electronic device 201 may be transitioned from a closed state to an open state or from an open state to a closed state.

According to an embodiment, the display 230 may include a bendable section. When the electronic device 201 is transitioned from a closed state to an open state, the bendable section may be slid out from the inner space of the electronic device 201, and accordingly, the display 230 may be expanded. When the electronic device 201 is transitioned from an open state to a closed state, at least a part of the bendable section may be slid into the inner space of the electronic device 201, and accordingly, the display 230 may be reduced.

For example, one end of the display 230 may be fixed to the first housing 210 to be rollable, and the other end of the display 230 may be fixed to the second housing 220 to be rollable. For example, the display 230 may include a flat section (A1), a first bendable section (A2-1) extending from one end of the flat section and drawn or rolled into the first housing 210, and a second bendable section (A2-2) extend-ing from the other end of the flat section (A1) and drawn or rolled into the second housing 220.

According to an embodiment, the locations of the first housing 210 and the second housing 220 may vary to have a designated separation distance according to operating conditions. For example, when the separation distance between the first housing 210 and the second housing 220 of the electronic device 201 increases in a first direction, the first bendable section (A2-1) and the second bendable section (A2-2) may be exposed to the outside to expand the area of the display 230. For another example, the separation distance between the first housing 210 and the second housing 220 of the electronic device 201 decreases in the second direction, the first bendable section (A2-1) and the second bendable section (A2-2) may be rolled to reduce the area of the display 230.

According to an embodiment, the first housing 210 and the second housing 220 may be implemented as a coupling structure enabling the first housing 210 and the second housing 220 to be coupled to each other, but is not limited thereto. For example, although the electronic device 201 is illustrated as having a part of the display 230 which is visually exposed in a state in which the first housing 210 and the second housing 220 are coupled, the electronic device 201 may be implemented such that the display 230 may be substantially or completely received in the first housing 210 and the second housing 220 so as not to be exposed.

According to an embodiment, although the electronic device 201 is illustrated as a structure enabling rolling in both directions, as shown in FIG. 2, the electronic device 201 may also be implemented as a unidirectional rollable electronic device in which the display 230 is rolled and stored in one of the first housing 210 and the second housing 220. For example, the electronic device 201 may be implemented such that the display 230 is rolled and stored in the first housing 210 or rolled and stored in the second housing 220.

For example, the electronic device 201 may be implemented to be a slidable type in which the first region (e.g., A2-1), which is part of the display 230 (e.g., a flexible display), may be visually exposed to the outside and the second region (e.g., A1 and A2-2), which are other parts of the display 230, are located inside the first housing 210 in the first state (e.g., a sliding-in state or a rolled state in which the parts are drawn into the first housing 210) and are not visually exposed to the outside, and are visually exposed to the outside in the second state (e.g., a sliding-out state or an unrolled state in which the parts are drawn out from the first housing 210). According to an embodiment, although the first housing 210 and the second housing 220 in FIG. 2 are illustrated as having a cylindrical shape as an example, and are not limited thereto, and the first housing 210 and the second housing 220 may be implemented in various shapes enabling the display 230 to be rolled and stored therein.

According to an embodiment, the piezoelectric speaker 240 may be an N-channel piezoelectric speaker. The piezo-electric speaker 240 may include N piezoelectric films (piezoelectric materials and/or piezoelectric components). The piezoelectric speaker 240 may include piezoelectric films arranged in an n*m matrix form. One piezoelectric film may operate as one piezoelectric speaker. For example, the piezoelectric speaker provided with 16 piezoelectric films may be referred to as a 16-channel piezoelectric speaker because one piezoelectric film operates as one speaker channel.

According to an embodiment, the piezoelectric speaker 240 may be implemented as a film-type piezoelectric speaker module. According to an embodiment, the piezo-electric speaker 240 may be attached to (or mounted on) the display 230 (e.g., the front surface of the flexible display).

According to an embodiment, the piezoelectric speaker 240 may include a piezoelectric film, shape of which is deformed according to voltage, a positive electrode and a negative electrode for applying a positive (+) or negative (−) voltage to the piezoelectric film, respectively, and a vibra-tion film which receives the shape deformation of the piezoelectric film to generate vibration. According to an embodiment, the vibration film may be a display or case of an electronic device.

According to an embodiment, in the piezoelectric speaker 240, when a voltage is applied through the positive electrode and the negative electrode, the shape of the piezoelectric film may be deformed according to the voltage, and the shape deformation may cause vibration of the vibration film so that sound is output to the outside.

Hereinafter, an example of the piezoelectric speaker 240 will be described with reference to FIG. 3.

FIG. 3 illustrates the structure of a piezoelectric speaker module according to one or more embodiments.

Referring to FIG. 3, the electronic device 301 (e.g., the electronic device 101 in FIG. 1 or the electronic device 201 in FIG. 2) according to an embodiment may include a film-type piezoelectric speaker 310 (e.g., the piezoelectric speaker 240 in FIG. 2), a first amplification circuit 320, a second amplification circuit 330, and an audio processor 340. The film-type piezoelectric speaker 310, which is in the form of a film, may be deformed in response to a change of a state or deformation of a display.

According to an embodiment, the film-type piezoelectric speaker 310 (e.g., the piezoelectric speaker 240 in FIG. 2) may include a vibration film 311, and N piezoelectric films 315 (N is a natural number).

According to an embodiment, the audio processor 340 may be included in an audio module (e.g., the audio module 170 in FIG. 1) or a processor (e.g., the processor 120 in FIG. 1) of the electronic device 201 (e.g., the electronic device 101 in FIG. 1). For example, an application processor (AP) of the electronic device 301 (e.g., the processor 120 in FIG. 1) may include an audio processor 340.

According to an embodiment, the film-type piezoelectric speaker 310 may output sound or vibration through each piezoelectric film 315. For example, the film-type piezo-electric speaker 310 may output sound to the outside by converting an audio output into an output of the piezoelec-tric film 315. One piezoelectric film 315 may operate as one piezoelectric speaker or one speaker channel.

According to an embodiment, vibration of the vibration film 311 may be generated by deformation of the piezoelec-tric film 315. The vibration film 311 may serve as a support member to which the piezoelectric film 315 is attachable. The vibration film 311 may be used as a transducer by deformation of the piezoelectric film 315 and may vibrate air to output sound by vibrational motion. Vibration of the vibration film 311 may be generated in a region to which a deformed piezoelectric film is attached.

The piezoelectric film 315, which is a film that converts electrical signals into electrical vibrations, may vibrate an object (e.g., a vibration film or at least a part of a display) in contact with the piezoelectric film when an electrical signal is input thereto through the positive/negative elec-trodes. The piezoelectric film 315 may include, for example, a polymer compound called polyvinylidene fluoride (PVDF).

The piezoelectric film 315 may include N piezoelectric films (e.g., S1 to S16). The N piezoelectric films (e.g., S1 to S16) may be arranged in a matrix form of rows and columns. In the example of FIG. 3, the piezoelectric films (e.g., S1 to S16) are arranged in the form of a 4*4 array matrix (S1 to S16), but this is an example for explanation only and is not limited thereto.

Each piezoelectric film 315 may be connected to the first amplification circuit 320 and the second amplification circuit 330. For example, the first amplification circuit 320 may be connected to the positive electrode ends of the piezoelectric films (e.g., S1 to S16), and the second amplification circuit 330 may be connected to the negative electrode ends of the piezoelectric films (e.g., S1 to S16). The first amplification circuit 320 may be connected to control the piezoelectric films (e.g., S1 to S16) arranged in a row, and the second amplification circuit 330 may be connected to control the piezoelectric films (e.g., S1 to S16) arranged in a column.

According to an embodiment, the piezoelectric film 315 may include piezoelectric films having different sizes (e.g., S1 to S16). For example, the size of another piezoelectric film (e.g., S2) may be larger than that of one piezoelectric film (e.g., S1). For example, sound output from another piezoelectric film (e.g., S2) may be lower than sound output from one piezoelectric film (e.g., S1).

According to an embodiment, the piezoelectric film 315 may be disposed on the front surface of a display (e.g., the display 230 in FIG. 2). For example, the piezoelectric film 315 may be disposed between a polarization layer and an organic material layer (e.g., a light emitting layer) of the display 230. According to another embodiment, the piezo-electric film 315 may be disposed on the rear surface of the display 230. For example, the piezoelectric film 315 may be disposed on the opposite side of a polarization layer with respect to an organic material layer (e.g., a light emitting layer). For another example, the piezoelectric film 315 may be disposed on both sides of the organic material layer (e.g., the light emitting layer).

According to an embodiment, the first amplification cir-cuit 320 may include a first amplifier (Y1) coupled to a first row (S1, S2, S3, and/or S4), a second amplifier (Y2) coupled to a second row (S5, S6, S7, and/or S8), a third amplifier (Y3) coupled to a third row (S9, S10, S11, and/or S12), and a fourth amplifier (Y4) coupled to a fourth row (S13, S14, S15, and/or S16). The second amplification circuit 330 may include a fifth amplifier (X1) coupled to the first column (S1, S5, S9, and/or S13), a sixth amplifier (X2) coupled to the second column (S2, S6, S10, and/or S14), a seventh ampli-fier (X3) connected to a third column (S3, S7, S11, and/or S15), and an eighth amplifier (X4) coupled to a fourth row (S4, S8, S12, and/or S16).

According to an embodiment, the first amplification cir-cuit 320 may apply an electrical signal having (+) polarity to the piezoelectric film, and the second amplification circuit 330 may apply an electrical signal having (−) polarity to the piezoelectric film.

According to an embodiment, the first amplification cir-cuit 320 and the second amplification circuit 330 may further include amplification circuits for separately or indi-vidually driving each piezoelectric film.

The audio processor 340 may provide a driving signal to each piezoelectric film 315 through the first amplification circuit 320 and the second amplification circuit 330 accord-ing to an audio output signal. The driving signal may be input to the positive/negative electrodes of each piezoelec-tric film 315 through the first amplification circuit 320 and the second amplification circuit 330.

The audio processor 340 may control the first amplification circuit 320 and the second amplification circuit 330 such that a driving signal is applied to the piezoelectric film disposed at a location from which an audio signal is to be output.

According to an embodiment, the audio processor 340 may generate vibration through the piezoelectric film 315 by controlling the first amplification circuit 320 and the second amplification circuit 330, thereby outputting sound.

According to an embodiment, the audio processor 340 may selectively drive each piezoelectric film 315. For example, when sound is output through S1 and S2, the audio processor 340 may provide driving signals (e.g., connection by applying a positive (+) or negative (−) voltage) to S1 and S2 through the first amplifier (Y1), the sixth amplifier (X1), and the seventh amplifier (X2). The piezoelectric film of S1 and S2 may be deformed by the driving signals, and the vibration film in the region in which S1 and S2 are disposed may vibrate according to the deformation to output sound.

According to an embodiment, the audio processor 340 may receive control signals of the first amplification circuit 320 and the second amplification circuit 330, for example, from the processor of the electronic device, and may control the first amplification circuit 320 and the second amplification circuit 330 according to the control signals.

FIG. 4 illustrates a configuration of an electronic device according to one or more embodiments.

Referring to FIG. 4, an electronic device (e.g., the electronic device 101 in FIG. 1 and the electronic device 201 in FIG. 2) according to an embodiment may include an N-channel piezoelectric speaker 440, a display 430, a sensor unit 420, and a processor 410. In one embodiment, the electronic device in FIG. 4 may further include at least some of the components and/or functions of the electronic device 101 in FIG. 1, in addition to the components shown in the drawing.

According to an embodiment, the N-channel piezoelectric speaker 440 may be attached or mounted to the electronic device 201 in the form of the (film-type) piezoelectric speaker 310 shown in FIG. 3. The N-channel piezoelectric speaker 440 may vibrate based on an audio signal to output sound under the control of the processor 410. In the N-channel piezoelectric speaker 440 may have a variable region in which sound output or vibration is to be generated, under the control of the processor 410.

According to an embodiment, the display 430 may display a graphical user interface (GUI) or an execution screen of an application program (App) under the control of the processor 410.

According to an embodiment, the display 430 may include a flexible display which is implemented to be deformable. For example, the display 430 may be rolled (or slid in) to be received or be unrolled (or slid out) to be unfolded by the housing of the electronic device 201. According to an embodiment, the display 430 may be implemented as a flexible touch screen in combination with a touch sensor.

According to an embodiment, the sensor unit 420 may detect information related to a change of a state or deformation of the display 430. The sensor unit 420 may include at least one of a contact sensor such as a touch sensor, an infrared ray (IR) sensor, a time of flight (TF) sensor, a non-contact sensor (e.g., a Hall sensor), a magnetic force sensor, a gravity sensor, a geomagnetic sensor, and an inertial sensor.

According to an embodiment, the sensor unit 420 may determine expansion/reduction of the display 430 and the degree thereof. For example, the sensor unit 420 may detect a change in area of the display region of the display in response to a change of a state or deformation of the display 430. The sensor unit 420 may detect the size of the display region (or an activated region) of the display 430. The sensor unit 420 may detect a closed state in which the display 430 is received inside the electronic device 201, an open state in which the display 430 is visually exposed, or an intermediate state.

According to an embodiment, the sensor unit 420 may detect the posture of the electronic device 201. For example, the sensor unit 420 may detect at least one of a rotation angle, rotation direction, rotation speed, gravitational direction, and rotation acceleration of the electronic device 201.

According to an embodiment, the sensor unit 420 may be connected to the piezoelectric film of the N-channel piezoelectric speaker 440 to detect a signal detected by deformation of the piezoelectric film. For example, the piezoelectric film may be deformed by a physical force without deformation of an electrical signal, and accordingly, an electrical signal may be generated. The sensor unit 420 may also detect a change of a state or deformation of the display 430, based on an electrical signal generated by deformation of the piezoelectric film.

According to an embodiment, the processor 410 may control the overall operation of the electronic device. In one embodiment, the processor 410 may execute a program stored in a memory to perform a designated function.

According to an embodiment, the processor 410 may identify a display region in which visual information to be displayed, from the entire region of the display according to change or deformation of the display 430. For example, the display region may refer to a region that displays image data to provide information to a user, and the area of the display region may be varied according to structural deformation or change of a state (e.g., an open state, a closed state) of the display 430.

According to an embodiment, the processor 410 may perform control such that the N-channel piezoelectric speaker 440 is driven in response to a change in area of the display region. For example, the processor 410 may transmit a control signal related to audio output to an audio processor (e.g., the audio processor 340 in FIG. 3) of the N-channel piezoelectric speaker 440. The audio processor 340 may variably control the piezoelectric film of the N-channel piezoelectric speaker 440 such that sound is output to at least a partial region or the entire region of the display 430, based on the control signal related to the audio output from the processor 410.

According to an embodiment, the processor 410 may perform control such that a sound output region to which sound is to be output from the N-channel piezoelectric speaker 440 is varied in response to deformation of the display 430. The processor 410 may perform control such that a sound output area is varied according to the size of the sound to be output.

According to an embodiment, the processor 410 may selectively or locally drive each piezoelectric film included in the N-channel piezoelectric speaker 440 to vary the sound output region. For example, the processor 410 may perform control such that sound is output from the channel piezoelectric speaker 440 through 8 piezoelectric films. The processor 410 may variably adjust a sound volume or a sound output region by adjusting the number of piezoelectric films to be driven or the locations of the piezoelectric films.

According to an embodiment, the processor 410 may classify the piezoelectric films into groups, based on locations at which the piezoelectric films are disposed, and perform control such that sound is output by each group. For example, the first and second columns may be classified as a first group, the third and fourth columns may be classified as a second group, and control may be performed such that different driving signals or different sound (or channels) are output by each group.

According to one or more embodiments, a flexible electronic device (e.g., the electronic device 101 in FIG. 1, the electronic device 201 in FIG. 2, and the electronic device 301 in FIG. 3) may include a sensor module (e.g., the sensor module 176 in FIG. 1 and the sensor unit 420 in FIG. 4), a flexible display (e.g., the display module 160 in FIG. 1, the display 230 in FIG. 2, and the display 430 in FIG. 4), a piezoelectric speaker including N piezoelectric films attached to the flexible display (e.g., the piezoelectric speaker 240 in FIG. 2, the film-type piezoelectric speaker 310 in FIG. 3, and an N-channel piezoelectric speaker 440 in FIG. 4), and a processor (e.g., the processor 120 in FIG. 1 and the processor 410 in FIG. 4), wherein the processor may be configured to detect a change of a state of the flexible display through the sensor module, determine locations and the number of piezoelectric films through which sound is to be output, among the N piezoelectric films, in response to the change of a state of the flexible display, and output sound by variably controlling the piezoelectric films to be activated, according to the determined locations and number of piezoelectric films.

According to one or more embodiments, the piezoelectric speaker may include the N piezoelectric films, a vibration film, a first amplification circuit unit, and a second amplification circuit unit, and may be implemented such that a driving signal is applied to each piezoelectric film by a crossing signal of the first amplification circuit unit and the second amplification circuit unit.

A flexible electronic device according to one or more embodiments may further include a housing, and the processor may be configured to detect, through the sensor unit, a first state in which at least a part of the flexible display is drawn into the inner space of the housing or a second state in which at least a part of the flexible display is drawn out to the outer space of the housing, or detect the first state or the second state, based on the electrical signals generated from N piezoelectric films of the piezoelectric speaker.

According to one or more embodiments, the processor may be configured to select, as the piezoelectric films to be activated, the piezoelectric films disposed in a region in which sound is to be output, among the N piezoelectric films, according to the change into the first state or the second state.

According to one or more embodiments, the processor may classify the piezoelectric films to be activated, into a first group and a second group, perform control such that sound of a first signal is output via the first group, and perform control such that sound of a second signal is output via the second group.

According to one or more embodiments, the processor may detect a posture change of the flexible electronic device through the sensor unit, and determine locations and the number of piezoelectric films through which sound is output, among the N piezoelectric films, according to the posture change.

According to one or more embodiments, the processor may detect an input for adjusting volume, and select and increase the number of piezoelectric films through which sound is output among the N piezoelectric films, in response to the input for adjusting volume.

According to one or more embodiments, the processor may be configured to display visual information corresponding to an audio signal through the flexible display, identify the location of the piezoelectric films disposed corresponding to a display region in which the visual information is displayed, and selectively drive the identified piezoelectric films such that sound is output to the region in which the visual information is displayed.

According to one or more embodiments, when visual information displayed on the flexible display is moved, the processor may be configured to variably adjust the locations of the piezoelectric films to be activated, according to the movement of the visual information to selectively control driving of the piezoelectric films in response to the movement of the visual information.

FIG. 5 illustrates a method for adjusting sound output by a flexible electronic device according to one or more embodiments.

Referring to FIG. 5, according to an embodiment, a processor 410 of an electronic device (the electronic device 101 in FIG. 1, the electronic device 201 in FIG. 2, and the electronic device 301 in FIG. 3) may detect a change of a state of a display in operation 510. The processor 410 may detect a change in the display region or area of the display.

For example, a flexible electronic device may have variable display region due to sliding in/out. The processor 410 may detect a change of a state of the display through the sensor unit and detect at least one of the size, location, area, and aspect ratio of the display region visually exposed to the outside. The processor 410 may identify a display region (or activated region) to display visual information from the entire region of the display.

The processor 410 may configure a visually and externally exposed partial region of the entire region of the display as a display region and identify the area (or size) of the display region. According to an embodiment, the processor 410 may identify the area (or size) of the visually exposed display region, based on the sensing information received from the sensor unit 420.

In operation 520, the processor 410 may identify the arrangement locations of exposed piezoelectric films in the piezoelectric speaker attached to the display, based on the display region of the display.

For example, when a part of the display is rolled, the processor may identify the piezoelectric films disposed in an unrolled display region.

In operation 530, the processor 410 may determine a piezoelectric film to be activated, to output sound according to the arrangement of the piezoelectric speaker.

According to an embodiment, when the front surface of the display of the electronic device is opened, the processor 410 may identify that the N-channel piezoelectric speaker attached to the front surface of the display may be substantially exposed to the outside, and designate the entire N-channel piezoelectric speaker as an activated speaker (or piezoelectric film).

According to an embodiment, in order to adjust sound output, the processor 410 may identify an arrangement location of the externally exposed piezoelectric film in the N-channel piezoelectric speaker, and determine the piezoelectric film disposed in the first region as the piezoelectric film to be activated. According to an embodiment, when the state of the electronic device 101 or the housing is changed so that the piezoelectric film is disposed outside the housing (e.g., the first housing 210 and the second housing 220), the piezoelectric film exposed to the outside may be determined as the piezoelectric film to be activated. According to an embodiment, the processor 410 may determine a piezoelectric film to be designated as a first group and a piezoelectric film to be designated as a second group according to an arrangement location of an externally exposed piezoelectric film in the N-channel piezoelectric speaker.

In operation 540, the processor 410 may output an audio signal by selectively driving the piezoelectric films. The processor 410 may identify connection lines of the first amplification circuit and the second amplification circuit which are connected to the piezoelectric film to selectively drive the piezoelectric films through which sound is output by generating vibration, and may generate a control signal of the first amplification circuit and the second amplification circuit such that the piezoelectric films are driven by the intersection between the first amplification circuit and the second amplification circuit. The processor 410 may transfer the control signal for outputting sound to the audio processor.

FIG. 6 illustrates a situation in which sound output is adjusted by a flexible electronic device according to one or more embodiments.

Referring to FIG. 6, an electronic device (e.g., the electronic device 101 in FIG. 1 or the electronic device 201 in FIG. 2) according to an embodiment may automatically adjust the locations and the number of piezoelectric speakers 640 or sound output region according to a change in area of the display 620 to support a function of outputting sound.

As shown in 6001, the display of the electronic device 201 may be deformed into an open state by the first housing 610 and the second housing 615. The electronic device 201 may have a first size (d1) when the entire region of the display 620 is visually exposed to the outside. The electronic device 201 may control sound output through the piezoelectric speaker 640 attached to the display 620.

For example, when the display 620 is in an open state, the electronic device 201 may apply driving signals to S1, S2, S3, S4, S13, S14, S15, and S16 in consideration of the location of the piezoelectric film of the piezoelectric speaker 640 so as to output sound. In order to drive S1, S2, S3, S4, S13, S14, S15, and S16, the electronic device may control the driving of Y1 and Y4 of the first amplification circuit in the column and X1, X2, X3, and X4 of the second amplification circuit in the row.

For example, the piezoelectric film of S1 may be deformed due to the intersection between the (+) polarity signal of the first amplifier (Y1) and the (−) polarity signal of the fifth amplifier (X1), and accordingly, sound may be output from the S1 region due to the deformation. The sound output generation principles of S2, S3, S4, S13, S14, S15, and S16 are the same, and the descriptions thereof will be omitted.

According to an embodiment, the electronic device 201 may output different sound signals by distinguishing S1, S2, S3, S4, S13, S14, S15, and S16 into a first group and a second group. For example, the electronic device 201 may utilize the first group (e.g., S1, S2, S13, and S14) as a left channel and utilize the second group (e.g., S3, S4, S14, and S15) as a right channel. Alternatively, the electronic device 201 may utilize S1, S2, S13, and S14 as a high-frequency channel and utilize S3, S4, S14, and S15 as a low-frequency channel.

As shown in 6002, the first housing 610 and the second housing 615 of the electronic device 201 may be in an intermediate state during sound output, so that a partial region of the display 620 may be rolled into the housings and stored therein. When in the intermediate state, the display 620 may have a second size (d1). The electronic device 201 may identify the area of the display deformed to the second size (d1), and identify the locations S1, S2, S3, S4, S5, S6, S7, S8, S9, S10, S11, and S12 of the exposed piezoelectric films.

The electronic device 201 may vary the piezoelectric film such that S1, S2, S3, S4, S9, S10, S11 and S12 is driven in response to the deformation of the display 620, and control, for S1, S2, S3, S4, S9, S10, S11 and S12, the driving of Y1 and Y3 of the first amplification circuit and X1, X2, X3 and X4 of the second amplification circuit in the row. In 6002, the electronic device 201 may output sound by selecting S1, S2, S10, and S11 as the first group and selecting S3, S4, S11, and S12 as the second group.

FIG. 7 illustrates a situation in which sound output is adjusted by a flexible electronic device according to one or more embodiments.

Referring to FIG. 7, an electronic device (e.g., the electronic device 101 in FIG. 1 or the electronic device 201 in FIG. 2) according to an embodiment may automatically adjust the sound output region or the locations and the number of piezoelectric speakers 740 according to the posture change of the electronic device 201 or the rotating mode of the display 720 so as to support a function of outputting sound.

As shown in 7001, the electronic device 201 may operate in a portrait mode (direction ④) and then operate in a landscape mode (direction ③) as shown in 7002. For example, the electronic device 201 may operate in a portrait mode (a direction ④) and then operate in a landscape mode (a direction ③), based on a signal from the sensor unit (e.g., the sensor unit 420 in FIG. 4) (e.g., the gyro sensor or gravity sensor).

When the electronic device 201 is in portrait mode in a state in which the display 720 is in an open state by the first housing 710 and the second housing 715, the electronic device 201 may output sound by applying driving signals to S1, S2, S3, S4, S13, S14, S15, and S16 in consideration of the locations of the piezoelectric films of the piezoelectric speaker 740. The electronic device 201 may output a first signal via the first group (e.g., S1, S2, S13, and S14), and output a second audio signal via the second group (e.g., S3, S4, S14, and S15).

As shown in 7002, the electronic device 201 may detect that the landscape mode has been changed during sound output, and may vary the location of the sound output according to the change into the landscape mode. In the landscape mode, the electronic device 201 may group S1, S4, S5, and S8 into a first group to output a first signal, and group S9, S12, S13, and S16 into a second group to output a second signal.

FIG. 8 illustrates a situation in which sound output is adjusted by a flexible electronic device according to one or more embodiments.

Referring to FIG. 8, an electronic device (e.g., the electronic device 101 in FIG. 1 and the electronic device 201 in FIG. 2) according to an embodiment may automatically adjust a sound output region or the location and number of piezoelectric speakers according to sound volume adjustment to support a function of outputting sound.

The electronic device 201 may output sound in a first size in a state in which the display 820 is in an open state by the first housing 810 and the second housing 815. For example, when sound is output in the first size, the electronic device 201 may output the sound by applying driving signals to S1, S2, S3, S4, S13, S14, S15, and S16 of the piezoelectric speaker 740. The electronic device 201 may designate S1, S2, S13, and S14 as the first group to output a first signal, and designate S3, S4, S14, and S15 as the second group to output a second audio signal.

The electronic device 201 may receive a volume increase request input during sound output. As shown in 8002, in response to the volume increase request, the electronic device 201 may perform control such that S1, S2, S5, S6, S9, S10, S13, and S14 as a first group to output a first signal having a second size, and S3, S4, S7, S8, S11, S12, S15, and S16 are designated as a second group to output a second signal having a second size.

FIG. 9 illustrates a situation in which sound output is adjusted by a flexible electronic device according to one or more embodiments.

Referring to FIG. 9, an electronic device (e.g., the electronic device 101 in FIG. 1 or the electronic device 201 in FIG. 2) according to an embodiment may automatically adjust the region to which sound is to be output and the location of the piezoelectric speaker 940 in response to visual information displayed on a display 920 to support a function of outputting sound.

In a state in which the display 920 is in an open state by the first housing 910 and the second housing 915, when an audio signal is included in response to visual information to be displayed on the display, the electronic device 201 may output sound along with the visual information. For example, as shown in 9001, the electronic device 201 may output sound related to a running horse while displaying a running horse object 950 during displaying an image on the display 920. The electronic device 201 may detect that the running horse object is output form a location at which the piezoelectric film Si is disposed and perform control such that the sound is output to the region S1 by driving the piezoelectric film S1 along with display of the running horse object.

Thereafter, as shown in 9002, the electronic device 201 may detect that the image display of the running horse object 950 moves in the direction of the arrow 955, and may selectively vary the driving of the piezoelectric films through which sound is to be output, according to the display location of the running horse object 950, to drive the piezoelectric film. The electronic device 201 may vary the piezoelectric film such that sound is output through the piezoelectric film, S1→S6→S11→S16 according to the display location of the running horse object 950, to provide a user with a desirable sound effect by varying the sound output location along with visual information.

According to one or more embodiments, a method for adjusting sound output by an electronic device (e.g., the electronic device 101 in FIG. 1, the electronic device 201 in FIG. 2, and the electronic device 301 in FIG. 3) including a flexible display (e.g., the display module 160 in FIG. 1, the display 230 in FIG. 2, and the display 430 in FIG. 4) may include detecting a change of a state of the flexible display to which a piezoelectric speaker (e.g., the piezoelectric speaker 240 in FIG. 2, the film-type piezoelectric speaker 310 in FIG. 3, the N-channel piezoelectric speaker 440 in FIG. 4) including N piezoelectric films is attached, determining locations and the number of piezoelectric films through which sound is to be output, among the N piezoelectric films, in response to the change of a state of the flexible display, and outputting sound by variably controlling the piezoelectric films to be activated, according to the determined locations and number of piezoelectric films.

According to one or more embodiments, the outputting of sound by variably controlling the piezoelectric films to be activated may include individually driving the piezoelectric films by selectively applying a driving signal by a crossing signal of a first amplification circuit unit and a second amplification circuit unit connected to each piezoelectric film.

According to one or more embodiments, the detecting of a change of a state of the flexible display may include detecting a first state in which at least a part of the flexible display is drawn into the inner space of the housing, or a second state in which at least a part of the flexible display is drawn out to the outer space of the housing.

According to one or more embodiments, the determining of the locations and the number of piezoelectric films through which sound is to be output may include selecting, as piezoelectric films to be activated, the piezoelectric films disposed in a region in which sound is to be output, among the N piezoelectric films, according to the change into the first state or the second state.

According to one or more embodiments, the outputting of sound by variably controlling the piezoelectric films to be activated may further include classifying the piezoelectric films to be activated, into a first group and a second group, performing control such that sound of a first signal is to be output via the first group, and performing control such that sound of a second signal is to be output via the second group.

According to one or more embodiments, the method may further include the detecting a posture change of the flexible electronic device, and in the determining of the locations and the number of piezoelectric films through which sound is to be output, the locations and the number of piezoelectric films through which sound is to be output among the N piezoelectric films may be determined according to the posture change.

According to one or more embodiments, the method may further include detecting an input for adjusting volume. In the determining of the locations and the number of piezoelectric films through which sound is to be output, the number of piezoelectric films through which sound is to be output among the N piezoelectric films may be increased and selected in response to the input for adjusting volume.

According to one or more embodiments, the method may further include displaying visual information corresponding to an audio signal through the flexible display. In the outputting of sound by variably controlling the piezoelectric films to be activated, the locations of piezoelectric films disposed corresponding to a display region in which visual information is displayed may be identified, and the identified piezoelectric films may be selectively driven such that sound may be output to the region in which the visual information is displayed.

In the outputting sound to a region in which visual information is displayed, when visual information displayed on the display is moved, the locations of the piezoelectric films to be activated may be variably adjusted according to the movement of the visual information to selectively drive the piezoelectric films in response to the movement of the visual information.

According to one or more embodiments, the electronic device 201 including the piezoelectric speaker may be applied to various structures.

FIG. 10A is a front perspective view of the electronic device 101 in a closed state according to an embodiment. FIG. 10B is a rear perspective view of the electronic device 101 in a closed state according to an embodiment. FIG. 11A is a front perspective view of the electronic device 101 in an open state according to an embodiment. FIG. 11B is a rear perspective view of the electronic device 101 in an open state according to an embodiment. According to one or more embodiments, the electronic device 101 in FIG. 10A may include the electronic device 101 in FIG. 1.

Referring to FIGS. 10A, 10B, 11A, and 11B, in an embodiment, the electronic device 101 may be implemented to expand a screen 1301 in a sliding manner. For example, the screen 1301 may be an externally visible region of the flexible display 1030. FIGS. 10A and 10B illustrate the electronic device 101 in a state in which the screen 1301 is not expanded, and FIGS. 11A and 11B illustrate the electronic device 101 in a state in which the screen 1301 is expanded. A state in which the screen 1301 is not expanded is a state in which the sliding plate 1020 for sliding motion of the display 1030 is not slid out, and may be referred to as a "closed state" hereinafter. A state in which the screen 1301 is expanded is a fully expanded state in which the screen 1301 is no longer expanded by sliding out of the sliding plate 1020, and may be referred to as an "open state" hereinafter. For example, sliding out may indicate that the sliding plate 1020 at least partially moves in a first direction (e.g., the +x-axis direction) when the electronic device 101 is transitioned from the closed state to the open state. According to one or more embodiments, the open state may be defined as a state in which the screen 10301 is expanded compared to the closed state, and screens of various sizes may be provided according to a moved position of the sliding plate 1020. According to one or more embodiments, an intermediated state may refer to a state between the closed state in FIG. 10A and the open state in FIG. 11A. The screen 10301 may include an active area of the flexible display 1030 that is visually exposed to enable image output, and the electronic device 101 may adjust the active area according to the movement of the sliding plate 1020 or the movement of the flexible display 1030. In the following description, the open state may refer to a state in which the screen 10301 is fully expanded. In an embodiment, the flexible display 1030 that is slidably disposed in the electronic device 101 in FIG. 10A and provides the screen 10301 may also be referred to as a "slide-out display" or an "expandable display".

According to an embodiment, the electronic device 101 may include a sliding structure related to the flexible display 1030. For example, when the flexible display 1030 is moved a configured distance by an external force, the electronic device may be transitioned from the closed state to the open state or from the open state to the closed state without any further external force due to an elastic structure included in the sliding structure (e.g., semi-automatic slide action).

According to an embodiment, when a signal is generated through an input device included in the electronic device 101, the electronic device 101 may be transitioned from the closed state to the open state or from the open state to the closed state due to a driving device such as a motor connected to the flexible display 1030. For example, when a signal is generated through a hardware button or a software button provided through a screen, the electronic device 101 may be transitioned from the closed state to the open state or from the open state to the closed state.

According to one or more embodiments, when signals are generated from various sensors such as a pressure sensor, the electronic device 101 may be transitioned from the closed state to the open state or from the open state to the closed state. For example, when the electronic device 101 is carried or gripped by hand, a squeeze gesture in which a part (e.g., the palm of the hand or a finger) of the hand presses within a designated section of the electronic device 101 may be detected through a sensor, and in response to this, the electronic device 101 may be transitioned from the closed state to the open state or from the open state to the closed state.

According to an embodiment, the flexible display 1030 may include a second section (see ② in FIG. 11A). The second section ② may include an expanded part of the screen 10301 when the electronic device 101 is transitioned from the closed state to the open state. When the electronic device 101 is transitioned from the closed state to the open state, the second section ② may be slidably drawn out from the inner space of the electronic device 101, and thus the screen 10301 may be expanded. When the electronic device 101 is transitioned from the open state to the closed state, at least a part of the second section ② may be slidably drawn into the inner space of the electronic device 101, and as a result, the screen 10301 may be reduced. When the electronic device 101 is transitioned from the open state to the closed state, at least a part of the second section ② may be bent and moved to the inner space of the electronic device 101. For example, the flexible display 1030 may include a flexible substrate (e.g., a plastic substrate) formed of a polymer material including polyimide (PI) or polyester (PET). The second section ② may be a bending part of the flexible display 1030 when the electronic device 101 is transitioned between the open state and the closed state, and may be referred to as, for example, a bendable section. In the following description, the second section ② will be referred to as a bendable section.

According to an embodiment, the electronic device 101 may include a housing 1010, a sliding plate 1020, or a flexible display 1030.

The housing (or a case) 1010 may include, for example, a back cover 212, a first side cover 213, or a second side cover 1014. In one embodiment, the back cover 1012, the first side cover 1013, or the second side cover 1014 may be connected to a support member located inside the electronic device 101, and may at least partially form the exterior of the electronic device 101.

The back cover 1012 may form, for example, at least a part of the rear surface 101B of the electronic device 101. In one embodiment, the back cover 1012 may be substantially opaque. For example, the back cover 1012 may be formed of coated or colored glass, ceramic, polymer, metal (e.g., aluminum, stainless steel (STS), or magnesium), or a combination of at least two thereof. According to an embodiment, in a state in which the bendable section ② of the flexible display 1030 is drawn into the inner space of the housing 1010 (e.g., the closed state), at least a part of the bendable section ② may be arranged to be visible from the outside through the back cover 1012. In this case, the back cover 1012 may be formed of a transparent material and/or a translucent material.

According to an embodiment, the back cover 1012 may include a flat part 1012*a* and curved parts 1012*b* and 1012*c* located on opposite sides of each other with the flat part 1012*a* interposed therebetween. In one embodiment, the curved parts 1012*b* and 1012*c* may be disposed adjacent to the opposite longer edges of the back cover 1012, respectively, and may be bent toward the screen located on the opposite side of the back cover 1012 and extended seamlessly. According to an embodiment, the back cover 1012 may include one of curved parts 1012*b* and 1012*c* or may be implemented without the curved parts 1012*b* and 1012*c*.

According to an embodiment, the first side cover 1013 and the second side cover 1014 may be located on opposite sides of each other. For example, the first side cover 1013 and the second side cover 1014 may be positioned on the opposite sides of each other with the flexible display 1030 interposed therebetween in a second direction (e.g., y-axis direction) orthogonal to the first direction (e.g., the +x-axis direction) of the sliding out of the sliding plate 1020. The first side cover 1013 may form at least a part of the first lateral surface 1013*a* of the electronic device 101, and the second side cover 1014 may form at least part of the second lateral surface 1014*a* of the electronic device 101 facing in a direction opposite to the first lateral surface 1013*a*. The first side cover 1013 may include a first peripheral part (or a first rim) 1013*b* extending from the edge of the first lateral surface 1013*a*. For example, the first peripheral part 1013*b* may form at least a part of bezel at one side of the electronic device 101. The second side cover 1014 may include a second peripheral part (or a second rim) 1014*b* extending from the edge of the second lateral surface 1014*a*. For example, the second peripheral part 1014*b* may form at least a part of bezel at the other side of the electronic device 101.

According to an embodiment, in the closed state in FIG. 10A, the surface of the first peripheral part 1013*b*, the surface of the second peripheral part 1014*b*, and the surface of the sliding plate 1020 may be smoothly connected to form a curved part at one side, corresponding to the side of the first curved part 1030*b* of the screen 10301. According to one or more embodiments, the surface of the first peripheral part 1013*b* or the surface of the second peripheral part 1014*b* may include a curved part at the other side, corresponding to the side of the second curved part 1030*c* of the screen 10301, located on the opposite side of the first curved part 1030*b*.

According to an embodiment, the sliding plate 1020 may slide on the support member located inside the electronic device 101. At least a part of the flexible display 1030 may be disposed on the sliding plate 1020, and the closed state in FIG. 10A or the open state in FIG. 11A may be formed based on the position of the sliding plate 1020 on the support member. According to an embodiment, the flexible display 1030 may be attached to the sliding plate 1020 through an adhesive member (or an adhesive member). According to an embodiment, the adhesive member may include a heat-reactive adhesive member, a photo-reactive adhesive member, a general adhesive, and/or a double-sided tape. According to an embodiment, the flexible display 1030 may be slidably inserted into a recess disposed in the sliding plate 1020 to be fixedly disposed on the sliding plate 1020. The sliding plate 1020 may serve to support at least a part of the flexible display 1030 and may be referred to as a display support structure in an embodiment.

According to an embodiment, the sliding plate 1020 may include a third peripheral part 1020*b* forming an outer surface of the electronic device 101 (e.g., a surface exposed to the outside to form the exterior of the electronic device 101). For example, in the closed state in FIG. 10A, the third peripheral part 1020*b* may form a bezel around a screen together with the first peripheral part 1013*b* and the second peripheral part 1014*b*. In the closed state, the third periph-eral part 1020*b* may extend in the second direction (e.g., the y-axis direction) to connect one end of the first side cover 1013 and one end of the second side cover 1014. For example, in the closed state of FIG. 10A, the surface of the third peripheral part 1020*b* may be smoothly connected to the surface of the first peripheral part 1013*b* and/or the surface of the second peripheral part 1014*b*.

According to an embodiment, due to the slide-out of the sliding plate 1020, the electronic device 101 may have at least a part of the bendable section ② to come out from the inside thereof and provide the screen 10301 which is in an expanded state as shown in FIG. 11A (e.g., the open state).

According to an embodiment, in the closed state in FIG. 10A, the screen 10301 may include a flat part 1030*a*, and a first curved part 1030*b* and/or a second curved part 1030*c* positioned opposite sides of each other with the flat part 1030*a* interposed therebetween. For example, the first curved part 1030*b* and the second curved part 1030*c* may be substantially symmetrical to each other with the flat part 1030*a* interposed therebetween. For example, in the closed state in FIG. 10A, the first curved part 1030*b* and/or the second curved part 1030*c* may be positioned to correspond to the curved parts 1012*b* and 1012*c* of the back cover 1012, respectively, and may have a shape curved toward the back cover 1012. When the electronic device 101 is transitioned from the closed state in FIG. 10A to the open state in FIG. 11A, the flat part 1030*a* may be expanded. For example, a partial region of the bendable section ② forming the second curved part 1030*c* in the closed state in FIG. 10A may be included in the flat part 1030*a* expanded when transitioned from the closed state in FIG. 10A to the open state in FIG. 11A, and may be formed as another region of the bendable section ②.

According to an embodiment, the electronic device 101 may include an opening for inflow or outflow of the bend-able section ②, and/or a pulley located in the opening. The pulley may be positioned corresponding to the bendable section ②, and the movement and the moving direction of the bendable section ② may be guided through the rotation of the pulley in the transition between the closed state in FIG. 10A and the open state in FIG. 11A. The first curved part 1030*b* may be disposed to correspond to a curved surface disposed on one surface of the sliding plate 1020. The second curved part 1030*c* may be formed by a part corresponding to the curved surface of the pulley in the bendable section ②. The first curved part 1030*b* may be positioned on the opposite side of the second curved part 1030*c* in the closed or open state of the electronic device 101 to improve aesthetics of the screen 10301. According to an embodiment, the flat part 1030*a* may be implemented to be expanded without the first curved part 1030*b*.

According to an embodiment, the flexible display 1030 may further include a touch sensing circuit (e.g., a touch sensor). According to one or more embodiments, the flexible display 1030 may be combined or placed adjacent to a pressure sensor capable of measuring the intensity (pressure) of a touch, and/or a digitizer that detects a magnetic field-type pen input device (e.g., a stylus pen). For example, the digitizer may include a coil member disposed on a dielectric substrate to detect an electromagnetic induction-type reso-nant frequency applied from the pen input device.

According to an embodiment, the electronic device 101 may include a microphone hole 1051 (e.g., the input module 150 in FIG. 1), a speaker hall 1052 (e.g., the sound output module 155 in FIG. 1), a connector hole 1053 (e.g., the connecting terminal 178 in FIG. 1), a camera module 1054 (e.g., the camera module 180 in FIG. 1), or a flash 1055. According to one or more embodiments, the flash 1055 may be implemented to be included in the camera module 1054. In an embodiment, at least one of the components may be omitted from the electronic device 101 or another compo-nent may be added to the electronic device 101.

For example, the microphone hole 1051 may be disposed on at least a part of the second lateral surface 1014*a* to correspond to a microphone located inside the electronic device 101. The position of the microphone hole 1051 may vary without being limited to the embodiment of FIG. 10A.

According to an embodiment, the electronic device 101 may include a plurality of microphones capable of detecting the direction of sound.

The speaker hole 1052 may be disposed, for example, on at least a part of the second lateral surface 1014*a* to correspond to a speaker located inside the electronic device 101. The position of the speaker hole 1052 may be vary without being limited to the embodiment of FIG. 10A. According to one or more embodiments, the electronic device 101 may include a receiver hole for phone call. In an embodiment, the microphone hole 1051 and the speaker hole 1052 may be implemented as one hole, or the speaker hole 1052 may be omitted as in a piezo speaker.

The connector hole 1053 may be disposed on at least a part of the second lateral surface 1014*a* to correspond to a connector (e.g., a USB connector) located inside the electronic device 101. The electronic device 101 may transmit and/or receive power and/or data with an external electronic device electrically connected to the connector through the connector hole 1053. The location of the connector hole 1053 may vary without being limited to the embodiment of FIG. 10A.

The camera module 1054 and the flash 1055 may be located, for example, on the rear surface 101B of the electronic device 101. The camera module 1054 may include one or more lenses, an image sensor, and/or an image signal processor. The flash 1055 may include, for example, a light emitting diode or a xenon lamp. In an embodiment, two or more lenses (infrared camera, wide-angle, and telephoto lenses) and image sensors may be located on one surface of electronic device 101. According to one or more embodiments, without being limited to the embodiment of FIG. 10B or 11B, the electronic device 101 may include a plurality of camera modules. The camera module 1054 may be one of a plurality of camera modules. For example, the electronic device 101 may include a plurality of camera modules (e.g., a dual camera or a triple camera) each having a different property (e.g., angle of view) or function. For example, a plurality of camera modules (e.g., the camera module 1054) including lenses having different angles of view may be provided, and the electronic device 101 may perform control such that the angle of view of the camera module performed in the electronic device 101 is changed based on a user's selection. In addition, the plurality of camera modules may include at least one of a wide-angle camera, a telephoto camera, a color camera, a monochrome camera, or an infrared (IR) camera (e.g., a time of flight (TOF) camera or a structured light camera). According to an embodiment, the IR camera may operate as at least a part of a sensor module.

According to one or more embodiments, the electronic device 101 may further include a camera module (e.g., a front camera) configured to generate an image signal, based on light received through one surface (e.g., the front surface 101A) of the electronic device 101 placed in the direction in which the screen 10301 faces. For example, the camera module 1054 may be aligned with an opening (e.g., a through-hole or a notch) disposed through the flexible display 1030 to be located inside the housing 1010, without being limited to the embodiment of FIG. 10B or 11B. The camera module 1054 may generate an image signal by receiving light through the opening and a partial region of the transparent cover overlapping the opening. The transparent cover may serve to protect the flexible display 1030 from the outside, and may include, for example, a material such as polyimide or ultra-thin glass (UTG).

According to an embodiment, the camera module 1054 may be disposed at the bottom of at least a part of the screen 10301 of the flexible display 1030 without being limited to the embodiment of FIG. 10B or 11B, and perform a related function (e.g., image capturing) without visually distinguishing (or exposing) the location of the camera module 1054. In this case, for example, when viewed from the top of the screen 10301 (e.g., when viewed in the −z-axis direction), the camera module 1054 may be disposed to be at least partially overlapped with the screen 10301 and obtain an image of an external subject without being exposed to the outside.

According to one or more embodiments, the electronic device 101 may further include a key input device (e.g., the input module 150 in FIG. 1). The key input device may be located, for example, on the first lateral surface 1013*a* of the electronic device 101 formed by the first side cover 1013. In an embodiment, the key input device may include at least one sensor module.

According to one or more embodiments, the electronic device 101 may include various sensor modules (e.g., the sensor module 176 in FIG. 1). The sensor module may generate an electrical signal or data value corresponding to an internal operating state or an external environmental state of the electronic device 101. For example, the sensor module a proximity sensor configured to generate a signal related to the proximity of an external object, based on light received through the front surface 101A of the electronic device 101 placed in the direction in which the screen 10301 faces.

For example, the sensor module may include various biometric sensors, such as a fingerprint sensor or a heart rate monitor (HRM) sensor, configured to detect information about a living body, based on light received through the front surface 101A or the rear surface 101B of the electronic device 101. The electronic device 101 may include various other sensor modules, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, and a humidity sensor, or an illuminance sensor.

According to one or more embodiments, the electronic device 101 may also be implemented in a structure in which the screen is expanded from the third peripheral part 1020*b* when the sliding plate 1020 slides out, without being limited to the embodiments of FIGS. 10A, 10B, 11A, and 11C. For example, a partial region of the flexible display 1030 forming the first curved part 1030*b* in the closed state in FIG. 10A may be included in the flat part 1030*a* expanded when transitioned from the closed state in FIG. 10A to the open state in FIG. 11A and may be formed as another region of the flexible display 1030.

FIG. 12 is an exploded perspective view of the electronic device 101 of FIG. 10A according to an embodiment.

Referring to FIG. 12, in an embodiment, the electronic device 101 may include a back cover 1012, a first side cover 1013, a second side cover 1014, a support member assembly 1200, a pulley 1260, a sliding plate 1020, a flexible display 1030, a support sheet 1270, a multi-bar structure (or a multi-bar assembly) 1280, or a printed circuit board 1290 (e.g., a printed circuit board (PCB), a flexible PCB (FPCB), or a rigid-flexible PCB (RFPCB)). Redundant description of some of the reference numerals in FIG. 12 will be omitted.

According to an embodiment, the support member assembly (or a support structure) 1200, which is a frame structure capable of withstanding a load, may contribute to durability or rigidity of the electronic device 101. At least a part of the support member assembly 1200 may include a non-metallic material (e.g., a polymer) or a metallic material. The housing 1010 including the back cover 1012, the first side cover 1013, or the second side cover 1014 (see FIG. 10A), the pulley 1260, the sliding plate 1020, and the flexible display 1030, the support sheet 1270, the multi-bar structure 1280, or the printed circuit board 1290 may be disposed on or coupled to the support member assembly 1200.

According to an embodiment, the support member assembly 1200 may include a first support member 1210, a second support member 1220, a third support member 1230, a fourth support member 1240, or a fifth support member 1250.

The first support member (or a first bracket) 1210 may have, for example, a plate shape. The sliding plate 1020 may be disposed on one surface 1210a of the first support member 1210. The second support member (or a second bracket) 1220 may be in the form of a plate overlapping at least a part of the first support member 1210 when viewed in the z-axis direction, may be coupled to the first support member 1210 and/or third support member 1230.

The second support member 1220 may be positioned between the first support member 1210 and the third support member 1230. The third support member 1230 may be coupled to the first support member 1210 and/or the second support member 1220 with the second support member 1220 interposed therebetween. The printed circuit board 1290 may be disposed on the second support member 1220 between the first support member 1210 and the second support member 1220. The fourth support member 1240 may be coupled to one side of an assembly (or structure) in which the first support member 1210, the second support member 1220, and the third support member 1230 are coupled to each other. The fifth support member 1250 may be coupled to the other side of the assembly (or structure) in which the first support member 1210, the second support member 1220, and the third support member 1230 are coupled to each other, and may be located on the opposite side of the fourth support member 1240. The first side cover 1013 may be coupled to the support member assembly 1200 at the fourth support member 1240. The second side cover 1014 may be coupled to the support member assembly 1200 at the fifth support member 1250. The back cover 1012 may be coupled to the support member assembly 1200 at the third support member 1230. At least a part of the first support member 1210, the second support member 1220, the third support member 1230, the fourth support member 1240, or the fifth support member 1250 may include a metal material and/or a non-metallic material (e.g., a polymer). According to one or more embodiments, at least two or more of the first support member 1210, the second support member 1220, the third support member 1230, the fourth support member 1240, and the fifth support member 1250 may be integral with each other. According to an embodiment, the support member assembly 1200 may also refer to a structure forming at least a part of the first support member 1210, the second support member 1220, the third support member 1230, the fourth support member 1240, and the fifth support member 1250. According to an embodiment, some of the first support member 1210, the second support member 1220, the third support member 1230, the fourth support member 1240, and the fifth support member 1250 may also be omitted.

The first support member 1210 may include, for example, a first lateral surface facing the fourth support member 1240, a second lateral surface 1210c facing the fifth support member 1250 and positioned opposite to the first lateral surface, a third lateral surface connecting one end of the first lateral surface and one end of the second lateral surface 1210c, or a fourth lateral surface 1210d connecting the other end of the first lateral surface and the other end of the second lateral surface 1210c and positioned opposite to the third lateral surface. According to an embodiment, the pulley 1260 may be located near the third lateral surface of the first support member 1210. As another example, in the case of an electronic device configured to slide out in the opposite direction, the pulley 1260 may be located near the fourth lateral surface 1210d of the first support member 1210. The pulley 1260 may include a cylindrical roller 1261 extending from the fifth support member 1250 toward the fourth support member 1240 (e.g., the +y-axis direction). The pulley 1260 may include a first rotation shaft and a second rotation shaft 1263 connected to the roller 1261, and the first rotation shaft and the second rotation shaft 1263 may be located on opposite sides of each other with a roller 1261 interposed therebetween. The first rotation shaft may be positioned between the roller 1261 and the first side cover 1013 and may be connected to the fourth support member 1240. The second rotation shaft 1263 may be positioned between the roller 1261 and the second side cover 1014 and may be connected to the fifth support member 1250. The fourth support member 1240 may include a first through-hole 1241 into which the first rotation shaft is inserted, and the fifth support member 1250 may include a second through-hole 1251 into which the second rotation shaft 1263 is inserted. The roller 1261 may be rotatable based on the first rotation shaft disposed on the fourth support member 1240 and the second rotation shaft 1263 disposed on the fifth support member 1250.

According to an embodiment, the sliding plate 1020 may be disposed on the support member assembly 1200 so as to slide on the first support member 1210. For example, a sliding structure may be provided between the first support member 1210 and the sliding plate 1020 to support and guide the coupling therebetween and the movement of the sliding plate 1020. According to an embodiment, the sliding structure may include at least one elastic structure 1201. When the sliding plate 1020 is moved a configured distance by an external force, transition from the closed state in FIG. 10A to the open state in FIG. 11A or from the open state to the closed state may be performed by the at least one elastic structure 1201 without any further external force. The at least one elastic structure 1201 may include various elastic members such as a torsion spring. For example, the torsion spring as the elastic structure 1201 may include one end connected to the sliding plate 1020, the other end connected to the first support member 1210, and a spring part between the one end and the other end. When the sliding plate 1020 is moved by an external force by a configured distance in the first direction of slide-out (e.g., the +x-axis direction), the position of one end relative to the other end may be changed so that the sliding plate 1020 may move in the first direction due to the elasticity of the spring part without any further external force, and accordingly, transition from the closed state in FIG. 10A to the open state in FIG. 11A may be performed. When the sliding plate 1020 is moved by an external force by a configured distance in the second direction opposite to the first direction (e.g., −x-axis direction), the position of one end relative to the other end may be changed so that the sliding plate 1020 may move in the second direction due to the elasticity of the spring part without any further external force, and accordingly, transition from the open state in FIG. 11A to the closed state in FIG. 10A may be performed.

According to one or more embodiments, the housing 1010 may further include at least a part of the support member assembly 1200. For example, the housing 1010 may include one surface (e.g., one surface 1210a formed by the first support member 1210) facing in the first direction (e.g., the +z-axis direction), and the other surface (e.g., the rear surface 101B in FIG. 10B) facing in the second direction (e.g., the −z-axis direction) and opposite to the first direction. The display support structure 1220 may be disposed on one surface (e.g., one surface 1210a formed by the first support member 1210) of the housing 1010 to be slidable in the third direction perpendicular to the first direction (e.g., the x-axis direction). According to an embodiment, the flexible display 1030 may include a first section ①  extending from the bendable section ②. The first section ①  may be disposed on the sliding plate 1020. During transition from the closed state in FIG. 10A to the open state in FIG. 11A, due to the movement of the sliding plate 1020, the bendable section ②  connected to the first section ①  may be slidably moved out, and as a result, the screen (see screen 10301 in FIG. 11A) may be expanded. During transition from the open state in FIG. 10A to the closed state in FIG. 11A, due to the movement of the sliding plate 1020, the bendable section ②  may be at least partially moved into the electronic device 101, and as a result, the screen (see screen 10301 in FIG. 10A) may be reduced. The support member assembly 1200 may include an opening for inflow or outflow of the bendable section ②, and the pulley 1260 may be positioned in the opening. The opening may include a gap between one side of the first support member 1210 and one side of the third support member 1230, and a part 431 of the third support member 1230 adjacent to the opening may have a curved shape corresponding to the curved surface of the roller 1261. The pulley 1260 may be positioned corresponding to the bendable section ②, and the pulley 1260 may be rotated by the movement of the bendable section ②  in the transition between the closed state in FIG. 10A and the open state in FIG. 11A.

According to an embodiment, a support sheet 1270 may be attached to the rear surface of the flexible display 1030. The rear surface of the flexible display 1030 may refer to a surface positioned opposite to a surface from which light is emitted from a display panel including a plurality of pixels. The support sheet 1270 may contribute to durability of the flexible display 1030. The support sheet 1270 may reduce an effect of a load or stress, which may occur during transition between the closed state in FIG. 10A and the open state in FIG. 11A, on the flexible display 1030. The support sheet 1270 may prevent the flexible display 1030 from being damaged by force transmitted from the sliding plate 1020 during moving. Although not shown, the flexible display 1030 may include a first layer including a plurality of pixels and a second layer combined with the first layer. The first layer may include, for example, a light emitting layer (e.g., a display panel) including a plurality of pixels implemented by a light emitting element such as an organic light emitting diode (OLED) or a micro light emitting diode (LED), and various other layers (e.g., an optical layer, such as a polarization layer, for improving screen quality or outdoor visibility). According to an embodiment, the optical layer may selectively pass light generated from a light source of the light emitting layer and vibrating in a certain direction. According to an embodiment, when viewed from the top of the screen 10301 (e.g., when viewed in the −z-axis direction), a plurality of pixels may not be arranged in a partial region of the flexible display 1030 that at least partially overlaps the at least one electronic component (e.g., a camera module or a sensor module) included in the electronic device 101. According to an embodiment, when viewed from above the screen 10301, a partial region of the flexible display 1030 that at least partially overlaps at least one electronic component (e.g., a camera module or a sensor module) included in the electronic device 101 may include a pixel structure and/or wiring structure different from those of other regions. For example, a partial region of the flexible display 1030 that at least partially overlaps the at least one electronic component (e.g., a camera module or a sensor module) may have a pixel density different from those of other regions. For example, a partial region of the flexible display 1030 that at least partially overlaps the at least one electronic component (e.g., a camera module or a sensor module) may be implemented as a substantially transparent region formed by change of the pixel structure and/or wiring structure even without an opening. The second layer may include various layers for supporting and protecting the first layer (e.g., a cushioning member), shielding light, absorbing or shielding electromagnetic waves, or spreading, dispersing, or dissipating heat. According to an embodiment, at least a part of the second layer, which is a conductive member (e.g., a metal plate), may advantageously reinforce the rigidity of the electronic device 101, and may be used to shield ambient noise, and dispersing heat dissipated from surrounding heat dissipating components (e.g., a display drive circuit). According to an embodiment, the conductive member may include at least one of copper (Cu), aluminum (Al), stainless steel (SUS), or CLAD (e.g., a laminated member having SUS and Al alternately disposed on each other).

The support sheet 1270 may at least partially cover the second layer of the flexible display 1030 and may be attached to the rear surface of the second layer. The support sheet 1270 may be formed of various metal materials and/or non-metal materials (e.g., polymers). According to one embodiment, the support sheet 1270 may include stainless steel. According to an embodiment, the support sheet 1270 may include engineering plastic. According to an embodiment, the support sheet 1270 may be integrally implemented with the flexible display 1030. According to an embodiment, the support sheet 1270 may include a lattice structure at least a partially overlapping a part in which the flexible display 1030 is bent (e.g., the bendable section ②  of FIG. 11A or 4 (the first curved part 1030b of FIG. 10A or 11A)). The lattice structure may include a plurality of openings or a plurality of slits, and may contribute to flexibility of the flexible display 1030. According to one or more embodiments, the support sheet 1270 may include a recess pattern including a plurality of recesses by replacing the lattice structure, and the recess pattern may contribute to the flexibility of the flexible display 1030. According to one or more embodiments, the lattice structure or the recess pattern may extend as at least a part of the flat part 1030a in FIG. 10A or 11A. According to one or more embodiments, the support sheet 1270 including a lattice structure or a recess pattern or a conductive member corresponding thereto may be formed of a plurality of layers.

According to an embodiment, a multi-bar structure 1280 may be connected to the sliding plate 1020, and include a first surface 481 facing the support sheet 1270, and a second surface 482 positioned opposite side of the first surface 481. When the sliding plate 1020 moves, the movement and direction of the multi-bar structure 1280 may be guided by the roller 1261 rotating in friction with the second surface 482. According to an embodiment, the second surface 482 may include a plurality of arranged bars extending from the second rotational shaft 1263 of the pulley 1260 toward the first rotational shaft (e.g., the +y-axis direction). The multi-bar structure 1280 may be bent at parts having relatively thin thickness among the plurality of bars. In one or more embodiments, this multi-bar structure 1280 may be referred to by other terms such as "flexible track" or "hinge rail".

According to an embodiment, in the closed state in FIG. 10A or the open state in FIG. 11A, at least a part of the multi-bar structure 1280 may be positioned to overlap the screen 10301 (see FIG. 10A or 11A), and may support the bendable section ② such that the bendable section ② of the flexible display 1030 is smoothly connected to the first section ① of the flexible display 1030 and maintains the connection without being lifted therefrom. In the transition between the closed state in FIG. 10A and the open state in FIG. 11A, the multi-bar structure 1280 may advantageously enable the bendable section ② to move while maintaining the smooth connection to the first section ① without being lifted.

According to an embodiment, the support sheet 1270 may substantially make elements (e.g., the multi-bar structure 380) located inside the electronic device 101 invisible through the flexible display 1030.

In a state in which the screen is expanded (e.g., the open state in FIG. 11A), a non-smooth screen may be provided due to lifting caused by elasticity of the flexible display 1030 and/or the support sheet 1270. According to one or more embodiments, a tension structure for the flexible display 1030 and/or the support sheet 1270 may be provided to prevent the non-smooth screen. The tension structure may contribute to smooth slide operation while maintaining tension.

According to an embodiment, a processor (e.g., the processor 120 in FIG. 1), a memory (e.g., the memory 130 in FIG. 1), and/or an interface (e.g., the interface 177 in FIG. 1) may be mounted on the printed circuit board 1290. The processor may include, for example, one or more of a central processing unit, an application processor, a graphics processing unit, an image signal processor, a sensor hub processor, or a communication processor.

The memory may include, for example, volatile memory or non-volatile memory. The interface may include, for example, a high-definition multimedia interface (HDMI), a universal serial bus (USB) interface, an SD card interface, and/or an audio interface. For example, the interface may electrically or physically connect the electronic device 101 to an external electronic device, and may include a USB connector, an SD card/MMC connector, or an audio connector.

The electronic device 101 may include various other elements disposed on the printed circuit board 1290 or electrically connected to the printed circuit board 1290. For example, the electronic device 101 may include a battery positioned between the first support member 1210 and the second support member 1220 or between the second support member 1220 and the back cover 1012. The battery, which is a device for supplying power to at least one element of the electronic device 101, may include, for example, a non-rechargeable primary battery, a rechargeable secondary battery, or a fuel cell. The battery may be integrally disposed inside the electronic device 101 or may be detachably disposed in the electronic device 101. According to an embodiment, the electronic device 101 may include an antenna located between the first support member 1210 and the second support member 1220 or between the second support member 1220 and the back cover 1012. The antenna may include, for example, a near field communication (NFC) antenna, a wireless charging antenna, and/or a magnetic secure transmission (MST) antenna. The antenna may, for example, perform short-range communication with an external device or wirelessly transmit/receive power required for charging. In another embodiment, the antenna structure may be formed by a part of the first side cover 1013 and/or the second side cover 1014 or a combination thereof.

According to an embodiment, the electronic device 101 may include a flexible printed circuit board (FPCB) 1237 configured to electrically connect the flexible display 1030 and the printed circuit board 1290. For example, the flexible printed circuit board 1237 may be electrically connected to the printed circuit board 1290 through an opening disposed through the sliding plate 1020 and an opening disposed through the first support member 1210. As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a sensor;
a flexible display;
a piezoelectric speaker comprising a plurality of piezo-electric films attached to the flexible display;
at least one processor; and
memory storing instructions,
wherein the instructions, when executed by the at least one processor, cause the electronic device to be configured to:
detect, through the sensor, a change in a state of the flexible display;
based on the detected change in the state of the flexible display, select at least one piezoelectric film from the plurality of piezoelectric films to output sound; and
output the sound through the selected at least one piezoelectric film.

2. The electronic device of claim 1, wherein the piezo-electric speaker further comprises a vibration film, a first amplification circuit, and a second amplification circuit, and
wherein a driving signal is applied to the at least one piezoelectric film by a crossing signal of the first amplification circuit and the second amplification cir-cuit.

3. The electronic device of claim 1, further comprising a housing,
wherein the instructions, when executed by the at least one processor, cause the electronic device to be con-figured to:
detect, through the sensor, a first state in which at least a first part of the flexible display is drawn into an inner space of the housing or a second state in which at least a second part of the flexible display is drawn out to an outer space of the housing; and
select the at least one piezoelectric film based on the first state or the second state.

4. The electronic device of claim 3, wherein the instruc-tions, when executed by the at least one processor, cause the electronic device to be configured to detect the first state or the second state, based on an electrical signal generated from the plurality of piezoelectric films.

5. The electronic device of claim 1, wherein the instruc-tions, when executed by the at least one processor, cause the electronic device configured to:
classify the at least one piezoelectric film into a first group and a second group;
output first sound of a first signal via the first group; and
output second sound of a second signal via the second group.

6. The electronic device of claim 1, wherein the instruc-tions, when executed by the at least one processor, cause the electronic device to be configured to:
detect a posture change of the electronic device through the sensor; and
determine locations and the at least one piezoelectric film based on the posture change.

7. The electronic device of claim 1, wherein the instruc-tions, when executed by the at least one processor, cause the electronic device to be configured to:
detect an input for adjusting volume; and based on the input for adjusting volume, increase and select the at least one piezoelectric film through which the sound is output among the plurality of piezoelectric films.

8. The electronic device of claim 1, wherein the instruc-tions, when executed by the at least one processor, cause the electronic device to be configured to:
display visual information corresponding to an audio signal through the flexible display;
identify a set of piezoelectric films disposed in a region in which the visual information is displayed; and
drive the identified set of piezoelectric films to output the sound.

9. The electronic device of claim 8, wherein the instruc-tions, when executed by the at least one processor, cause the electronic device to be configured to:
based on detection of movement of the visual information displayed on the flexible display, identify another set of piezoelectric films based on the movement of the visual information, and
drive the identified another set of piezoelectric films to output the sound.

10. A method for adjusting sound output by an electronic device comprising a flexible display, the method compris-ing:
detecting, through a sensor, a change in a state of the flexible display to which a piezoelectric speaker is attached, the piezoelectric speaker comprising a plu-rality of piezoelectric films;
based on the detected change in the state of the flexible display, selecting at least one piezoelectric film from the plurality of piezoelectric films to output sound; and
outputting the sound through the selected at least one piezoelectric film.

11. The method of claim 10, wherein the detecting the change in the state of the flexible display comprises detect-ing a first size in which at least a first part of the flexible display is drawn into an inner space of a housing or a second size in which at least a second part of the flexible display is drawn out to an outer space of the housing, and
wherein the selecting the at least one piezoelectric film from the plurality of piezoelectric films comprises selecting a number of piezoelectric films based on the first size or the second size.

12. The method of claim 11, wherein the outputting the sound through the selected at least one piezoelectric film comprises:
classifying the number of piezoelectric films into a first group and a second group;
outputting first sound of a first signal via the first group; and
outputting second sound of a second signal via the second group.

13. The method of claim 10, further comprising detecting a posture change of the electronic device, wherein the at least one piezoelectric film is changed based on the posture change.

14. The method of claim 10, wherein the selecting the at least one piezoelectric film from the plurality of piezoelec-tric films comprises:
detecting an input for adjusting volume; and
based on the input for adjusting volume, increasing and selecting the at least one piezoelectric film among the plurality of piezoelectric films.

15. The method of claim 10, wherein the outputting the sound through the selected at least one piezoelectric film comprises:

displaying visual information corresponding to an audio signal through the flexible display;

identifying a set of piezoelectric films disposed in a region in which the visual information is displayed; and driving the identified set of piezoelectric films to output the sound to the region in which the visual information is displayed.

16. The method of claim 15, wherein the driving the identified set of piezoelectric films to output the sound to the region in which the visual information is displayed comprises, based on detection of movement of the visual information displayed on the flexible display, driving another set of piezoelectric films, based on the movement of the visual information to output the sound through the another set of piezoelectric films.

* * * * *